United States Patent
Li et al.

(10) Patent No.: US 9,575,563 B1
(45) Date of Patent: Feb. 21, 2017

(54) TAP TO INITIATE A NEXT ACTION FOR USER REQUESTS

(71) Applicant: Google Inc., Mountain View, CA (US)

(72) Inventors: Chun Yat Frank Li, Mountain View, CA (US); Daniel Rodriguez Magana, Mountain View, CA (US); Thiago Teixeira, San Francisco, CA (US); Charles Chen, San Francisco, CA (US); Anand Agarawala, Calgary (CA)

(73) Assignee: X Development LLC, Mountain View, CA (US)

( * ) Notice: Subject to any disclaimer, the term of this patent is extended or adjusted under 35 U.S.C. 154(b) by 72 days.

(21) Appl. No.: 14/144,177

(22) Filed: Dec. 30, 2013

(51) Int. Cl.
| | |
|---|---|
| G06F 3/041 | (2006.01) |
| G06F 3/01 | (2006.01) |
| G10L 15/00 | (2013.01) |
| G06F 3/044 | (2006.01) |
| G02B 27/01 | (2006.01) |

(52) U.S. Cl.
CPC .............. *G06F 3/017* (2013.01); *G06F 3/011* (2013.01); *G10L 15/00* (2013.01); *G02B 27/017* (2013.01); *G02B 2027/0178* (2013.01); *G06F 3/044* (2013.01)

(58) Field of Classification Search
CPC .......... G02B 27/017; G02B 2027/0178; G06F 3/011; G06F 3/012; G06F 3/167
USPC ........................................................ 345/173
See application file for complete search history.

(56) References Cited

U.S. PATENT DOCUMENTS

| | | | | |
|---|---|---|---|---|
| 5,414,443 A | * | 5/1995 | Kanatani | G09G 3/2011 345/89 |
| 7,813,822 B1 | * | 10/2010 | Hoffberg | G06K 9/00369 381/73.1 |
| 8,212,855 B2 | * | 7/2012 | Gupta | H04N 7/142 348/14.01 |
| 8,467,133 B2 | * | 6/2013 | Miller | G02B 27/017 353/28 |
| 8,504,599 B1 | * | 8/2013 | Grajo | G06F 17/30554 707/608 |
| 8,519,909 B2 | | 8/2013 | Gomez et al. | |
| 8,893,010 B1 | * | 11/2014 | Brin et al. | 715/738 |
| 2009/0150160 A1 | * | 6/2009 | Mozer | G06F 3/011 704/275 |

(Continued)

*Primary Examiner* — Temesghen Ghebretinsae
*Assistant Examiner* — Michael J Jansen, II
(74) *Attorney, Agent, or Firm* — McDonnell Boehnen Hulbert & Berghoff LLP

(57) ABSTRACT

Embodiments may relate to intuitive user-interface features for a head-mountable device (HMD), in the context of a hybrid human and computer-automated response system. An illustrative method may involve a head-mountable device (HMD) that comprises a touchpad: (a) sending a speech-segment message to a hybrid response system, wherein the speech-segment message is indicative of a speech segment that is detected in audio data captured at the HMD, and wherein the speech-segment is associated with a first user-account with the hybrid response system, (b) receiving a response message that includes a response to the speech-segment message and an indication of a next action corresponding to the response to the speech-segment message, (c) displaying a card interface that includes an indication of the response, and (d) while displaying the response, detecting a singular touch gesture and responsively initiating the at least one next action.

23 Claims, 13 Drawing Sheets

(56) References Cited

U.S. PATENT DOCUMENTS

| | | | |
|---|---|---|---|
| 2010/0185448 A1* | 7/2010 | Meisel | G10L 15/22 704/256.1 |
| 2012/0016678 A1* | 1/2012 | Gruber et al. | 704/275 |
| 2012/0022872 A1* | 1/2012 | Gruber et al. | 704/270.1 |
| 2012/0194419 A1* | 8/2012 | Osterhout et al. | 345/156 |
| 2012/0245944 A1* | 9/2012 | Gruber et al. | 704/270.1 |
| 2012/0265528 A1* | 10/2012 | Gruber et al. | 704/235 |
| 2013/0159001 A1* | 6/2013 | Stifelman | G06F 3/167 704/257 |
| 2013/0174205 A1 | 7/2013 | Jacobsen et al. | |
| 2013/0198685 A1 | 8/2013 | Bernini et al. | |
| 2013/0246512 A1 | 9/2013 | Lawler et al. | |
| 2013/0290308 A1* | 10/2013 | Grajo | G06F 17/30386 707/722 |
| 2013/0332168 A1* | 12/2013 | Kim | G10L 15/22 704/251 |
| 2014/0101608 A1* | 4/2014 | Ryskamp | G06F 3/0482 715/810 |
| 2014/0337037 A1* | 11/2014 | Chi | G06F 17/30401 704/275 |
| 2015/0123991 A1* | 5/2015 | Yarosh et al. | G02B 27/017 345/629 |
| 2016/0111090 A1* | 4/2016 | Holdren | G10L 15/22 704/251 |
| 2016/0253746 A1* | 9/2016 | Morrison | G06Q 30/0643 |

* cited by examiner

TAP TO INITIATE A NEXT ACTION FOR USER REQUESTS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

As computing devices become smaller and more portable, traditional input devices such as keyboards, mice, and even touchscreens, may not be as feasible as they once were. As such, speech-based interfaces are becoming an increasingly popular way of allowing users to interact with their computing devices. Speech-based interfaces may be particularly useful on devices such as head-mountable displays (HMDs) and mobile phones, where other types of user-input devices may be limited or may not be feasible.

SUMMARY

Example embodiments may relate to a user-interface feature by which a user can intuitively initiate related actions with a singular touch gesture, such as a tap or a swipe on a touchpad. More specifically, example embodiments may be implemented in the context of a hybrid response system, which is configured to provide responses to voice requests that are sent from users' head-mountable devices (HMDs). The hybrid response system may provide an automated response to a voice request, or may determine that a human assistance would be better than an automated response, in which case the voice request may be sent to one or more guide computing device that facilitate a human-assisted response. In either case, the response may include initial response information for display on the HMD, as well as indication of a next action; e.g., related information or an action related to the initial response information). As such, once the HMD has displayed the initial response information, the HMD may allow the user to display the related information or initiate the related action with a singular touch gesture, such as a tap on the HMD's touchpad.

In one aspect, a method involves: (a) sending a speech-segment message to a hybrid human and automated response system, wherein the sending is performed by a head-mountable device (HMD) that comprises a touchpad, wherein the speech-segment message is indicative of a speech segment that is detected in audio data captured at the HMD, and wherein the speech-segment is associated with a first user-account with the hybrid human and automated response system, (b) receiving, by the HMD, a response message, wherein the response message comprises a response to the speech-segment message and an indication of a next action corresponding to the response to the speech-segment message, (c) the HMD displaying a card interface that includes an indication of the response, and (d) while displaying the card interface that indicates the response, detecting touchpad data corresponding to a singular touch gesture on the touchpad and responsively initiating the at least one next action.

In another aspect, a system includes: (i) at least one microphone configured to provide an audio signal based on speech detected at a head-mountable device (HMD), wherein the HMD comprises a touchpad, (ii) a network interface, and (iii) a control system configured to: (a) detect a speech segment in the audio signal, (b) send a speech-segment message to a hybrid human and automated response system, wherein the speech-segment message is indicative of the speech segment, and wherein the speech-segment message is associated with a first user-account with the hybrid human and automated response system, (c) receive a response message, wherein the response message comprises a response to the speech-segment message and an indication of a next action corresponding to the response to the speech-segment message, (d) cause a display of the HMD to display a card interface that includes an indication of the response, and (e) while displaying the card interface that indicates the response, detect touchpad data corresponding to a singular touch gesture on the touchpad and responsively initiate the at least one next action.

In a further aspect, a non-transitory computer readable medium may have stored therein instructions that are executable by a computing device to cause the computing device to perform functions including: (a) sending a speech-segment message to a hybrid human and automated response system, wherein the speech-segment message is indicative of a speech segment that is detected in audio data captured at a head-mountable device (HMD) that comprises a touchpad, and wherein the speech-segment is associated with a first user-account with the hybrid human and automated response system, (b) receiving a response message, wherein the response message comprises a response to the speech-segment message and an indication of a next action corresponding to the response to the speech-segment message, (c) displaying a card interface that includes an indication of the response, and (d) while displaying the card interface that indicates the response, detecting touchpad data corresponding to a singular touch gesture on the touchpad and responsively initiating the at least one next action.

In a yet a further aspect, a system may include: (a) means for sending a speech-segment message to a hybrid human and automated response system, wherein the message is sent from a head-mountable device (HMD) that comprises a touchpad, wherein the speech-segment message is indicative of a speech segment that is detected in audio data captured at the HMD, and wherein the speech-segment is associated with a first user-account with the hybrid human and automated response system, (b) means for receiving a response message, wherein the response message comprises a response to the speech-segment message and an indication of a next action corresponding to the response to the speech-segment message, (c) means for displaying a card interface that includes an indication of the response, and (d) means for, while displaying the card interface that indicates the response, detecting touchpad data corresponding to a singular touch gesture on the touchpad and responsively initiating the at least one next action.

These as well as other aspects, advantages, and alternatives will become apparent to those of ordinary skill in the art by reading the following detailed description, with reference where appropriate to the accompanying drawings.

DETAILED DESCRIPTION

Figure 1:
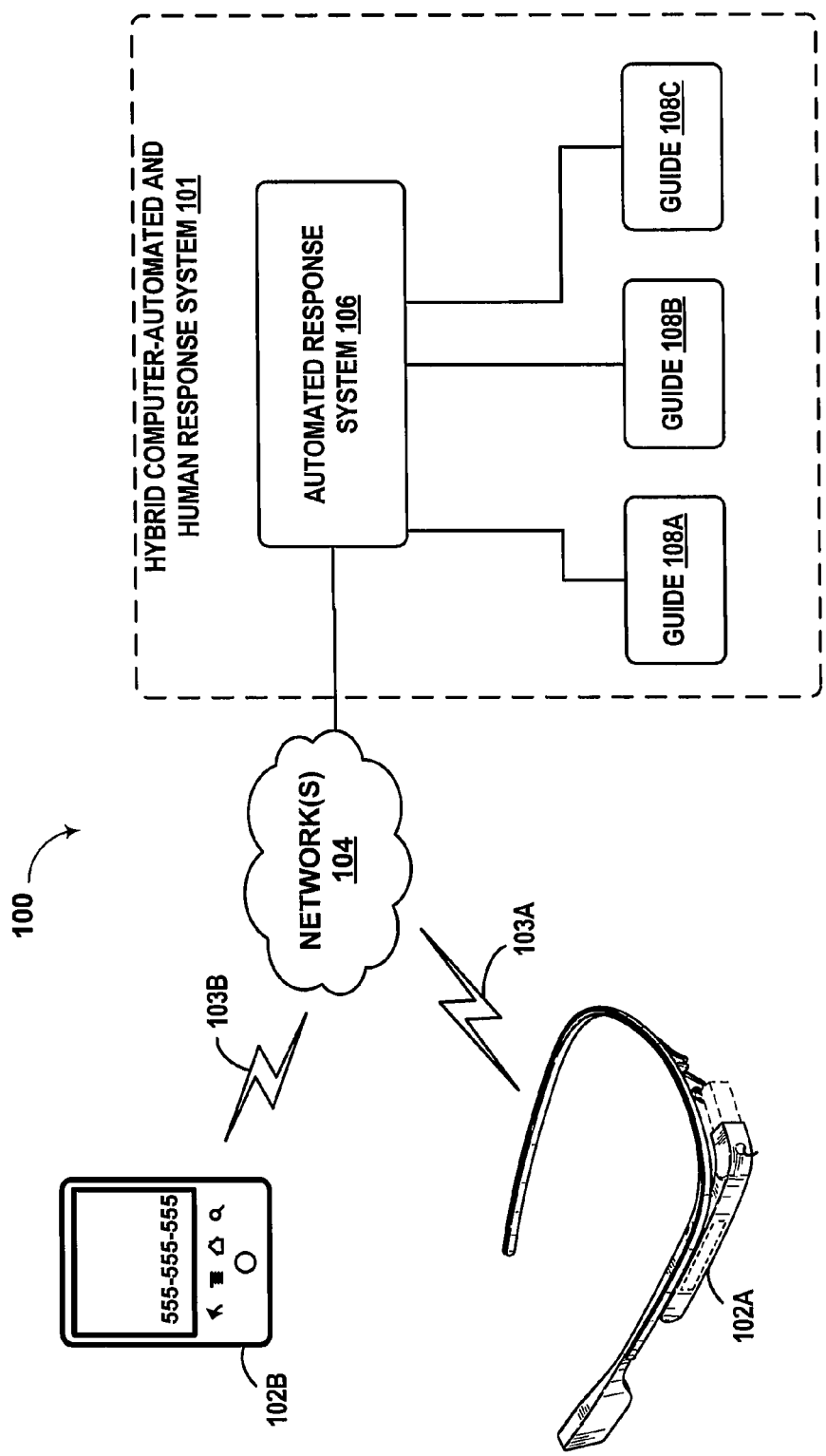
FIG. 1 is a block diagram illustrating components of a system, in which an example embodiment may be implemented.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Search engines are often used to obtain answers to queries or to seek other information. However, many queries cannot be accurately answered by search engines due to ambiguity in the query, lack of contextually important information, or some other factor. The ability of humans to interpret queries in ways that computational search engines cannot allows for more accurate responses to queries that are researched and answered by human experts.

Further, some devices, such as head-mountable devices (HMDs), may rely heavily on voice input for user interactions, as traditional user-input devices such as a keyboard, mouse, and/or a touchscreen, may be unavailable or cumbersome to use. Traditional search engines may be difficult or cumbersome to utilize effectively with only voice input.

In order to provide more intelligent responses to voice input, a hybrid computer-automated and human response system (referred to as "hybrid response system") may be provided, which is configured to handle voice input received at an HMD (or another type of client device). A hybrid response system may use a number of automated processes to determine possible responses to speech segments (e.g., questions or commands), as well as a confidence that each possible response is correct. Such process may include, for example, artificial intelligence (AI) processes (also referred to as machine-learning processes). If the confidence in one of these automated responses is high enough, then this automated response may be provided. However, if no high-confidence automated response can be determined, the speech segment may be sent to a guide computing device, which provides a UI to assist a human in determining an appropriate response. In such case, the guide computing device may send a human-assisted response to the HMD.

Example embodiments may relate to the responses that are provided by such a hybrid response system, and to HMD user interfaces for utilizing such responses. More specifically, in an example embodiment, when an HMD displays a response to e.g., a spoken question, the user may also be presented with one or more additional options that anticipate the next action such as displaying certain additional information or initiating a certain transaction, which is likely to be desired after viewing the response. The user may then initiate the next action with a single touchpad gesture (e.g., a single tap on a side-mounted touchpad of the HMD).

In some embodiments, a response message may initially be provided as a response to a request, question, or command that is detected in an HMD's voice input, and the next action may be a response to an anticipated follow-up question (e.g., a question that is believed to be a likely follow-up to the original question). As such, a guide may cue up such follow-up responses when or shortly after the original response is provided. In other words, a guide may be able to "spring load" a response to the anticipated next question. As such, once the original response is displayed, the user can immediately access the response to the anticipated next question with a single tap on their HMD's touchpad. Such next actions may be referred to as "tap-to-next" actions or options.

In some embodiments, tap-to-next options may only be displayed with a response when the intent of the user is ambiguous, such that the guide is unsure which of multiple responses is correct, or believes that the response may be incomplete. Further, a guide may utilize such tap-to-next functionality to lead the user through multiple steps; e.g., using a series of tap-to-next options to provide a multi-part response on the HMD.

II. Hybrid Response Systems

FIG. 1 is a block diagram illustrating components of a system 100, in which an example embodiment may be implemented. System 100 includes a Hybrid Computer-Automated and Human Response System 101 (which may be referred to simply as a "hybrid response system"), client devices 102A and 102B, and one or more communication networks 104.

A client device such as client device 102A or 102B may take various forms, such as a mobile phone, a tablet computer, laptop computer, a desktop computer, or a wearable computer, among other possibilities. In the illustrated example, client device 102A is a head-mountable device (HMD), and client device 102B is a smartphone. Further, client devices 102A and 102B may be configured to communicate with other devices via one or more communication networks 104 via respective communication links 103A and 103B.

Provided with network connectivity, a client device 102A or 102B may communicate with an hybrid response system 101. Further, client devices 102A and 102B may each be configured to receive voice input, and to generate or extract speech segments from the voice input. Further, client devices 102A and 102B may send speech-segment messages, which include such speech segments, to hybrid response system 101 via one or more networks 104, such as the Internet, a cellular network, and/or a service provider's network.

Note that herein, the term "speech segment" may refer to an audio segment that includes speech by a user of a client device 102A or 102B, or to the speech-to-text transcription of such speech, or possibly to a combination of an audio segment with speech and a speech-to-text transcription of such speech. Thus, a speech-segment message may be any message that includes a speech segment (in audio and/or text format). Various types of speech-segment messages are possible. For example, a speech-segment message sent by a client device to the hybrid response system may take the form of a potentially actionable-speech message, or could take other forms. As such, a potentially actionable-speech message may include an audio segment that includes speech by a user of a client device 102A or 102B, and/or may include a speech-to-text transcription of the speech in such an audio segment. A potentially actionable-speech message may also include other information, such as context information related to the client device and/or a user-account that is currently associated with the client device, for instance.

A client device 102A or 102B may provide various interface features that allow a user to interact with a hybrid response system 101. For instance, HMD 102A may allow a user to provide an explicit indication that the user is about to provide speech that should be sent to the hybrid response system 101 in a speech-segment message, such as in a potentially actionable-speech message. As an example, when the user taps and holds a touchpad on HMD 102A, and subsequently speaks, the subsequent speech may be captured as a speech segment and sent to the hybrid response system in a potentially actionable-speech message. Note that in this example, the HMD 102A may be configured to record speech after the user removes their finger from the touchpad, or may capture speech that occurs while still the user holds their finger on the touchpad. Client devices 102A and 102B may also be configured to detect speech segments for potentially actionable-speech messages without explicit input from the user; for example, by detecting words, a phrase, or phrases in speech that are deemed to be potentially actionable.

In an example embodiment, the components of hybrid response system 101 include an automated response system 106 and guide computing systems 108A to 108C. Hybrid response system 101 and/or the components thereof may be implemented in one or more computing clusters that are associated with an information-provider service. For example, the automated response system 106 may include one or more computing systems that are configured to receive speech-segment messages that are sent by client devices, and to analyze and potentially respond to such messages.

In a further aspect, automated response system 106 may apply one or more machine-learning response processes to a speech segment, in order to determine one or more potential responses to the speech segment. (Note that a machine-learning process may also be referred to as an artificial intelligence (AI) process.) A potential response that is generated by such an AI response process may be considered an "automated" response, since it is generated by a computing system, without the assistance of human input. Note that other automated processes, which do not involve AI or machine-learning, are also possible.

Automated response system 106 may be further configured to determine a confidence measure for each potential response that is generated by an automated response process. Further, automated response system 106 may be configured to determine if the confidence measure for a potential response satisfies certain criteria (e.g., exceeds a threshold) and, if the criteria are satisfied, to select the potential response as a response to the speech-segment message. Further, when there is acceptable confidence in an automated response, automated response system 106 may be configured to send the automated response to the client device 102A or 102B from which the corresponding speech-segment message was received.

If automated response system 106 cannot determine an automated response to a speech-segment message with an acceptable level of confidence, then automated response system 106 may be configured to send the speech-segment message, and/or a message containing information derived therefrom, to one or more guide computing systems 108A to 108C. Note that automated response system 106 and guide computing systems 108A to 108C may be part of a service provider's network, and may communicatively connected via wired or wireless links. Alternatively, some or all guide computing systems 108A to 108C may not be part of the service provider's network. For example, third party individuals who are pre-qualified as guides may connect to automated response system 106 via their home computers. In such an embodiment, automated response system 106 and guide computing systems 108A to 108C may communicate via one or more networks 104, such as the Internet and/or a cellular network.

Each guide computing system 108A to 108C may provide an interface via which a human can provide input. Such human input may be used to generate a response to a speech-segment message that was sent from a client device 102A or 102B.

For example, a guide computing system 108A to 108C may include or be connected to a graphic display on which the guide computing system can display a graphical user interface (GUI) that facilitates a human-assisted response to a speech-segment message. Such a GUI may include the text of a speech segment and/or other information that may facilitate taking an action related to the speech segment. The GUI may include features that prompt and/or receive human input, such as text and/or speech, via which a human guide can provide a response and/or information that may be used to generate a response. The GUI may also include interactive features (e.g., buttons, check boxes, drop-down menus, etc.) via which a human guide can provide a response and/or information that may be used to generate a response. Further, the GUI may include an interactive feature or features via which a human guide can indicate that a response is acceptable and should be sent to the client device 102A or 102B.

In some embodiments, the GUI may include a feature or features that provide a guide with context information that a user has elected to make available via a user-account with the hybrid response system 101. For example, if a user has consented to use of certain information by the hybrid response system 101 (and associated human guides), such as location information, calendar information, contact information, information related to past interactions with contacts, and/or past use of certain applications, such information may selectively provided in the GUI when the user sends a speech-segment message from their client device, in order to assist a guide in providing a personalized response.

Further, in some cases, a user may link other user-accounts to the user's account with the hybrid response system 101. For example, a user could link their email accounts, social-network accounts, and/or other types of user-accounts, to their user-account with the hybrid response system 101. In this scenario, a user may elect to allow full or partial access to such accounts to the hybrid response system (and possibly to associated human guides as well). If the user elects to provide access to such a linked account, then the GUI may include information obtained via the linked user-account, and/or may include a feature that allows a guide to access the linked user-account.

Generally, note that in situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In a further aspect of some embodiments, a guide computing system 108A to 108C may provide a GUI or another type of interface via which a human guide can send a communication to and/or establish a communication session with a client device 102A or 102B to which the guide is providing a response. For example, a guide computing system 108A to 108C may include an interface that allows a human guide to initiate a phone call to a client device 102A or 102B, initiate and/or engage in a text-based chat session with a client device 102A or 102B, send a text message (e.g., an SMS or MMS message) to a client device 102A or 102B, and/or send an e-mail to a client device, among other possibilities. Provided with such an interface, a guide may send a message or initiate a communication session to, e.g., request additional information to facilitate and/or improve the quality of a response.

In the illustrated example, communication links 103A and 103B are wireless links. For example, a client device 102A or 102B may establish and communicate via a respective communication link 103A or 103B using a wireless communication protocol, such as Bluetooth® radio technology, communication protocols described in IEEE 802.11 (including any IEEE 802.11 revisions), and/or cellular communication protocols (such as GSM, CDMA, UMTS, EV-DO, WiMAX, or LTE), among other possibilities. Note, however, that a client device 102A or 102B may additionally or alternatively be configured for network communications over one or more wired connections. For example, a communication link 103A or 103B may be a wired serial bus such as a universal serial bus or a parallel bus. A wired connection may be a proprietary connection as well, or may take other forms.

Variations on the system 100 illustrated in FIG. 1, and/or variations on the functionality attributed to components of system 100, are possible. For instance, multiple components may be combined in the same entity. As an example, a system may include more or less guide computing systems than shown in FIG. 1. Further, any component that is illustrated in FIG. 1 may be divided into two or more components that collectively provide the described functionality. Other variations from the illustrated examples are also possible.

Figure 2:
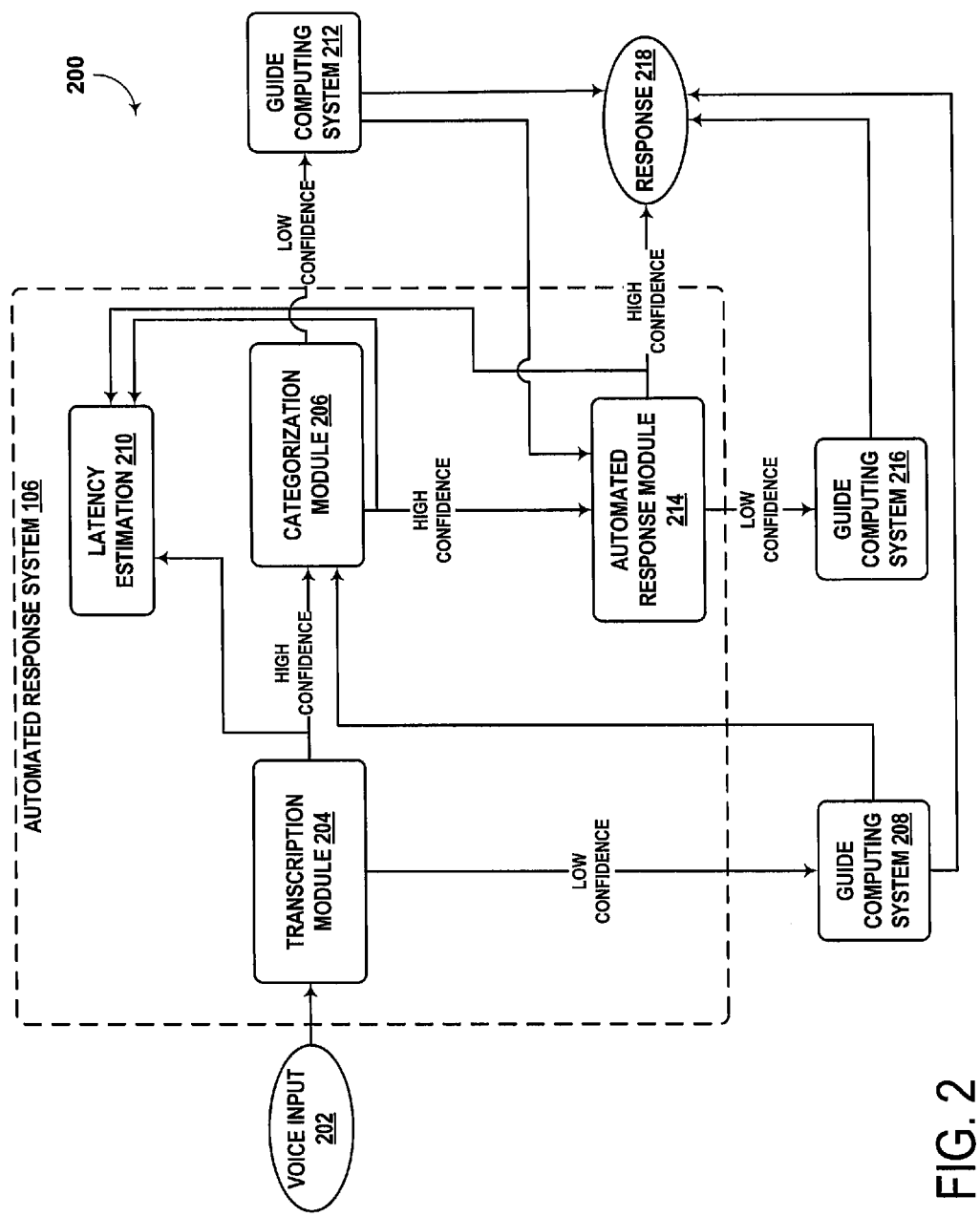
FIG. 2 is a block diagram showing functional components of a system, according to an example embodiment.

FIG. 2 is a block diagram showing functional components of a system 200, according to an example embodiment. Collectively, the components of system 200 may function to receive voice input (e.g., a speech segment), and to provide either an automated response or a human-assisted response to the question.

More specifically, voice input 202 may be received by a transcription module 204, which applies a speech-to-text process to generate text corresponding to the voice input 202. Further, transcription module 204 may analyze whether the corresponding text is an accurate transcription of the voice input 202. In particular, the transcription module 204 may determine a translation confidence measure that indicates how likely it is that the corresponding text is an accurate transcription. If the translation confidence measure exceeds a threshold, then the transcription module 204 may send the generated text to a categorization module 206. If the translation confidence measure is lower (e.g., less than a threshold), then the transcription module 204 may send the text (and possibly audio data that includes some or all of the voice input 202) to a guide computing system 208. Further, in some embodiments, if the confidence measure is very low (e.g., indicative of audio that does not include human speech), the transcription module 204 may discard the text without taking any further action.

The guide computing system 208 may provide an interface that facilitates evaluation of the generated text by a human guide. In particular, such an interface may allow a human guide to indicate whether or not the text is an accurate translation. Further, such an interface may allow the guide to edit the text such that it is more accurate transcription of the voice input. In the event that a human guide indicates that the text is an accurate transcription, and/or edits the text such that it is an accurate transcription, the guide computing system 208 may send the text to categorization module 206. Additionally or alternatively, and regardless of whether the text is an accurate transcription, the guide computing system 208 may provide an interface that allows the human guide to indicate that the text does not include a question to which a response can be provided, and thus should be discarded instead of being sent to categorization module 206.

The transcription module 204 or the guide computing system 208 may thus be the component that outputs a potentially actionable-speech message in which the speech segment includes text (and possibly an audio version of the text as well). As such, the transcription module could be implemented at a client device, or could be implemented as part of a service-provider's system. Alternatively, if the transcription module 204 is implemented as part of a service provider's network, the transcription module may receive and analyze a potentially actionable-speech message that is sent from a client device. Further, the potentially actionable-speech message may be sent to the categorization module 206 for further evaluation.

Categorization module 206 may analyze whether the received text includes speech to which a response can be provided (e.g., whether the speech segment is, in fact, "actionable"). In particular, the categorization module 206 may determine an actionable-speech confidence measure that indicates how likely it is that the text constitutes a question, a command, a request, or another type of message that is actionable. If the actionable-speech confidence measure exceeds a threshold, then the categorization module 206 may generate a speech-segment message that may be referred to as an actionable-speech message, which includes some or all of the text, and send the actionable-speech message to an automated response module 214.

Note that actionable speech segments may take various forms. For example, an actionable speech segment may be a question, such as "where can I get lunch right now?" An actionable speech segment could also be a command or an instructions, such as "buy those shoes for me." An actionable speech segment may take other forms as well. Further, while an actionable speech segment could make the desired response explicit, responsive actions may also be inferred from the speech segment and/or context information related to the client device and/or user-account associated with the speech segment.

In a further aspect, categorization module 206 may classify an actionable-speech message in various ways. For instance, categorization module 206 may determine that a speech segment is of a particular type, relates to certain topic, and/or that providing a response to a speech segment in the message has a certain difficulty level, among other possibilities. Accordingly, such classifications may be indicated in an actionable-speech message that is sent to automated response module 214.

If the actionable-speech confidence measure is lower (e.g., less than a threshold), then the categorization module 206 may send the generated text to a guide computing system 212. The guide computing system 212 may provide an interface that facilitates evaluation of the text by a human guide. In particular, the guide computing system 212 may provide an interface via which a human guide can indicate whether or not the text includes a question, and possibly edit the question such that it is more understandable. Further, the guide computing system 212 may provide an interface for classifying actionable speech segments in the same or a similar manner as a categorization module 206. Alternatively, once a human guide indicates that the text is actionable, the guide computing system 212 may send the text back to the categorization module 206, which may classify the speech segment and/or generate and send an actionable-speech message to automated response module 214.

Automated response module 214 may function to apply one or more automated processes to a given actionable-speech message, such as AI or machine-learning processes. Each automated process may output a response to the actionable-speech message, and a confidence score (i.e., a measure of confidence) indicating a confidence that the response is correct. If the confidence score for a response from one AI process is above a threshold at which the response is considered to be correct (e.g., greater than 99% confidence in the response), then this automated response may be selected as the response to the question, and sent to the corresponding client device.

Note that in some cases, there may be multiple responses having a confidence score that is above the threshold where the response is considered to be correct. In this scenario, one of the "correct" responses may be selected and sent to the client device. For example, the correct response having the highest confidence score may be selected, or one of the correct responses may be selected at random. As another example, automated response module 214 may send some or all of the correct responses to a guide computing system 216 for evaluation by a human guide, who can then select one correct response. Other techniques for selecting a response from multiple correct responses are possible.

If no automated response to an actionable-speech message has a confidence score above the threshold for a "correct" response, then automated response module 214 may forward the actionable-speech message to a guide computing system 216. The guide computing system 216 may present the speech segment from the actionable-speech message and/or other information included in or derived from the actionable-speech message to a human guide. Further, guide computing system 216 may provide an interface that allows a human guide to indicate a response, provide information from which a response may be generated, and/or initiate a responsive action.

In some embodiments, automated response module 214 may evaluate the confidence score or scores for automated responses in a more granular way. For instance, automated response module 214 may classify responses with one of three confidence levels: a high-confidence level (e.g., greater than 99% confidence), a medium-confidence level (e.g., 80-98% confidence), and a low-confidence level (e.g., less than 80%). If one or more automated responses are categorized as high-confidence responses, then automated response module 214 may initiated an automated response.

If there is no high-confidence automated response, then the information that is sent to the guide computing system may vary depending upon the confidence level or levels of the automated responses. For example, if all the automated responses have a low confidence level, then automated response module 214 may simply send the actionable-speech message to a guide computing system 216. However, if some or all of the automated responses have a medium-confidence level, then automated response module 214 may send the actionable-speech message and the medium-confidence responses to the guide computing system 216. The guide computing system 216 may then provide an interface that allows a human guide to quickly select one of the medium-confidence responses as the correct response. Such an interface may also include features that allow a guide to provide a response as they otherwise would, if the guide believes that none of the medium-confidence responses are correct.

Note that the feature of forwarding automated responses to guide computing systems may be applied in implementations other than those described above. In particular, when automated response module 214 determines that a guide computing system 216 should make the ultimate decision as to the correct response, automated response module 214 may send any response that was determined by one of its AI processes to the guide computing system 216 for consideration by a human guide. In order to facilitate a quicker response, automated response module 214 may limit the number of automated responses that are sent to the guide computing system 216 for consideration. However, automated response module 214 could theoretically send any number of automated responses to a guide computing system 216 for consideration.

Note that a response 218 may take various forms. For example, response 218 may be content that is sent to a client device associated with the actionable-speech message. Such a response 218 may include text, hyperlinks, graphic content, and/or other types of information that can be presented on a client device. A response 218 may also be a responsive action. For example, an AI process or guide computing system may response to an actionable-speech message by purchasing items via an associated user-account, or posting a message via an associated account on a social network (presuming, in both cases, that the user has authorized such functionality). Other examples of responsive actions are also possible. Further, note that depending upon a user's settings, the user may or may not be notified explicitly (e.g., via e-mail or text message) of such responsive actions.

In a further aspect, automated response module 214 may receive feedback from guide computing systems 208, 212 and/or 216, which may be used to improve the AI processes that are applied to incoming actionable-speech messages. Machine learning processes may then be applied to such feedback, so that the AI processes may improve over time. Note that as such AI processes improve, this may free up human guides to respond to more and more complex questions.

Automated response module 214 may use various types of feedback to improve the one or more AI processes that are applied to incoming actionable-speech messages. For example, when an actionable-speech message is sent to a guide computing system 216, automated response module may be informed of the human-assisted response that was sent to the client device and/or the steps that the human took to determine the response. As another example, each time an automated response is sent to a guide computing system 216 for consideration, automated response module 214 may be informed as to whether or not the automated response was selected as the correct response. As yet another example, when a client device receives an automated response from automated response module 214 or a human-assisted response from guide computing system 216, the client device may send feedback indicating the quality of the response. For instance, feedback from a client device may indicate whether the response provided information they needed, whether or not the response was correct, whether a better response could have been provided, and/or information that might improve future responses to similar questions, among other possibilities.

In a further aspect, system 200 may include a latency estimation module 210. The latency estimation module 210 may evaluate questions and estimate how long it will take for a response to be provided to a client device. Latency estimation module 210 may therefore be configured to send an estimated-response-time message to a client device that is awaiting the response. The estimated-response-time message may indicate an estimated period of time (e.g., 30 seconds) until the client device will receive a response to a question that was sent from the client device. Further, while a client device is awaiting a response, latency estimation module 210 may update the estimated response time, and send estimated-response-time message indicating such updates, as new information is received.

In order to estimate and/or update the estimated response time, latency estimation module 210 may receive information from transcription module 204, categorization module 206, automated response module 214, guide computing systems, and/or other sources. For example, latency estimation module 210 may increase or decrease an estimated response time for a actionable-speech message depending on: (a) whether the transcription module 204 has a lower or higher confidence in a transcription, respectively, (b) whether the categorization module 206 has a higher or lower confidence that the received text is actionable, (c) the complexity of the speech segment and/or the type or category of speech segment (e.g., as determined by categorization module 206), and/or (d) whether or not automated response module can provide an automated response with a high enough level of confidence, among other possibilities.

Note that some or all of guide computing systems 208, 212, 216 may be the same guide computing system. Alternatively, different guide computing systems may be utilized for some or all of the guide computing systems that may be involved in providing a response to a particular actionable-speech message.

Further, in some embodiments, all of the modules shown in FIG. 2 may be part of an automated response system 106. In other embodiments, some of the modules shown in FIG. 2 may be implemented at a client device 102A or 102B. For example, transcription module 204 and/or categorization module 206 may be implemented by a client device. Other examples are also possible.

III. Illustrative Methods

Figure 3:
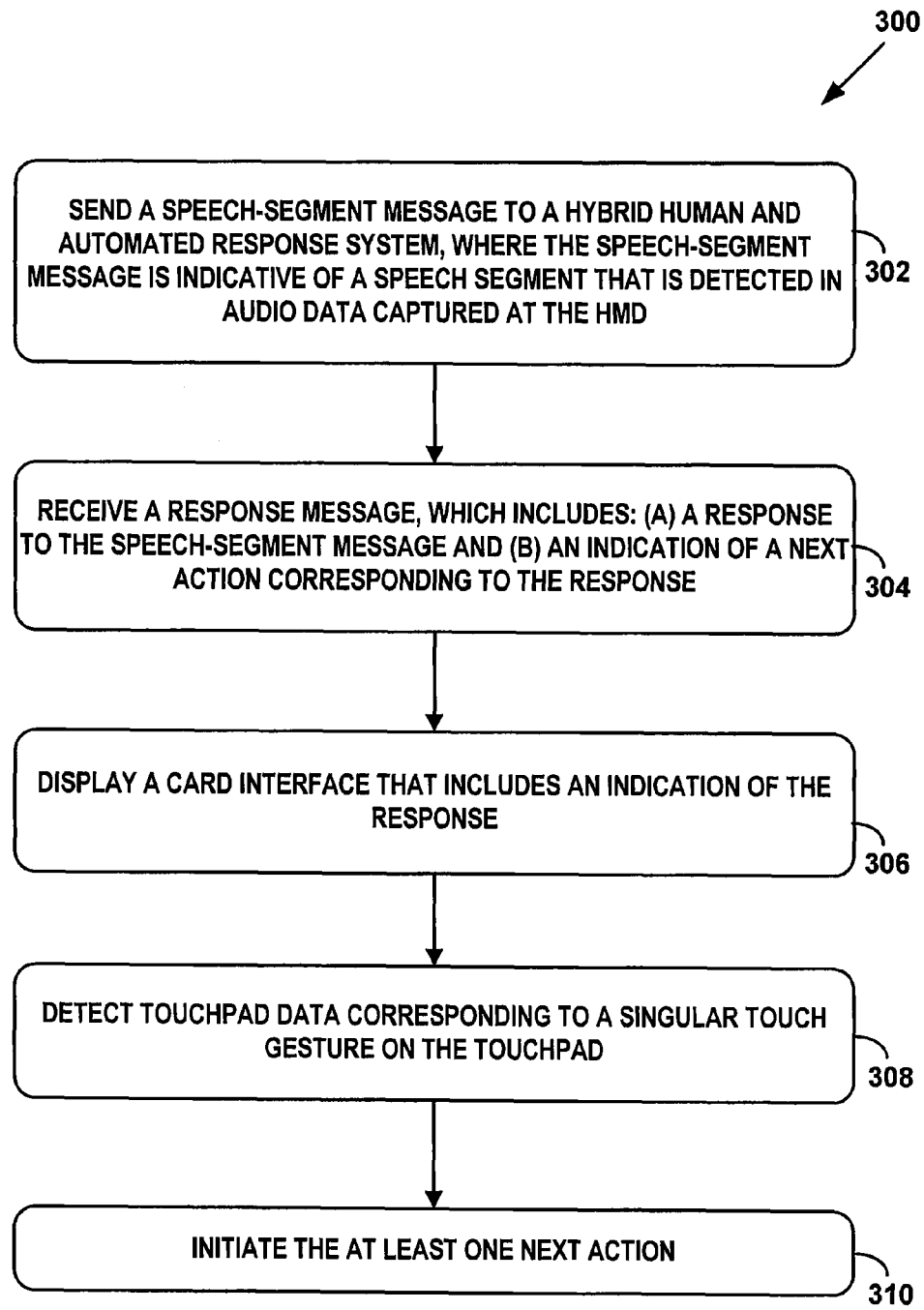
FIG. 3 is a flow chart illustrating a method, according to an example embodiment.

FIG. 3 is a flow chart illustrating a method 300, according to an example embodiment. Method 300 may be carried out to, for example, provide a "tap-to-next" interface feature in relation to a response from a hybrid response system. Method 300 may be carried out by an HMD, or a system therein (e.g., a processor and non-transitory computer readable medium with instructions that are executable to carry out the functionality described herein). Method 300 could also be carried out by other types of client devices, such as a mobile phone, tablet computer, or personal computer, among other possibilities.

Method 300 involves an HMD sending a speech-segment message to a hybrid human and automated response system, where the speech-segment message is indicative of a speech segment that is detected in audio data captured at the HMD, as shown by block 302. The HMD then receives a response message, which includes: (a) a response to the speech-segment message and (b) an indication of a next action corresponding to the response to the speech-segment message, as shown by block 304. The HMD may then display a card interface that includes an indication of the response, as shown by block 306. Further, while displaying the card interface with the indication of the response, the HMD may detect touchpad data corresponding to a singular touch gesture on the touchpad, as shown by block 308. When the singular touch gesture is detected, the HMD may responsively initiate the at least one next action, as shown by block 310.

At block 302, the speech-segment message may include various types of speech segments. For example, the speech segment may be a question, an information search query, a request for an action, or a command, among other possibilities.

At block 308, various types of singular touch gestures are possible. For instance, the singular touch gesture could be a single tap, a double tap (e.g., two taps performed in rapid succession, such that users typically perceive the two taps to be part of a single action), or a swipe. Other types of singular touch gestures are also possible. Generally, a singular touch gesture may be any touch-based input that a typical user perceives as being a single action.

Note that guides may cue up various types of next actions, depending upon the particular response that is being provided and/or other factors. Thus, at block 304, various types of next actions may be indicated in a response message.

For example, at block 304, the indication of the next action may include information that is related to the response, and in particular, an indication that such related information should be displayed in a second card interface (in the event the singular touch gesture is detected). Thus, when a singular touch gesture is detected at block 308, then block 310 may involve the HMD displaying a second card interface that indicates the information related to the response.

For example, if the displayed response is a card with a suggestion for a particular restaurant, then a single tap may cause the HMD to display another card with directions to the restaurant or a menu for the restaurant, among other possible related information. As another example, if the displayed response is a card with a movie suggestion, then a single tap may cause the HMD to display another card with nearby showtimes, an interface for purchasing tickets to the movie, and/or a summary of movie reviews, among other possibilities.

In some embodiments, at block 304, the indication of the next action may include an indication of a transaction that is associated with the response. For example, if the response includes an indication of a product or service, the indication of the next action may be an indication of a transaction that could be initiated in order to purchase of the product or service.

In some cases, when the response message indicates the possibility of initiating a purchase, block 310 may involve the HMD initiating a purchase of a product or service via a second user-account that is associated with the first user-account. For example, the HMD may display a card that identifies a certain product or service. Then, while displaying this card, the HMD may detect, e.g., a tap on its touchpad, and responsively initiate the purchase, without any requiring any further input. In such case, the HMD may also display a second card that confirms the purchase was made. Further, the second card might indicate a window of time during which the user could cancel this "one-tap" purchase.

In some embodiments, a window of time may be provided during which the user can cancel a "one-tap" purchase (regardless of whether this is indicated in a second card). In such, case the purchase may be canceled by again using a singular touch gesture. However, the purchase could additionally or alternatively be canceled with other types of input.

In some embodiments, when the response message indicates the possibility of initiating a purchase, a user may be provided with the ability to confirm a purchase, once the user has indicated the intent to purchase the product or service. For example, block 310 may involve the HMD displaying a second card interface that requests input that indicates whether or not to purchase a product or service. Regardless of whether of the manner in which a purchase is initiated, the purchase may be initiated via a second user-account associated with the first user-account (e.g., a user-account with a retailer that is associated with the hybrid response system).

In some embodiments, the response provided at block 304 may include proposed text for a message, which can be sent via the at least one second user-account associated with the first user-account. In such case, the indication of the next action may be an indication to display a second card interface, which indicates message-capable applications associated with the first user-account. For example, the HMD may first display a card with the text for the body of a message. When the HMD detects a single tap on its touchpad, the HMD may responsively display a second card with one or more second user-accounts via which the message can be sent.

A second user-account may be, for example, an e-mail account, a blog or micro-blog account, a social-network account, or a cellular-service account. The second card may therefore provide an interface via which a user can indicate which user-account or user-accounts they would like to use to send a message with the text indicated in the response. For example, the second card may allow the user to send an e-mail from a linked e-mail account, to post to an associated blog or micro-blog account, to post to a personal space such as a wall or timeline on a social-network account, to send a message to one or more connections on a social-network account, and/or to send a text message (e.g., an SMS or MMS message) via a cellular-service account, among other possibilities.

Note that in some cases, the HMD may have a "messaging-capable" application installed that provides for messaging via a particular second user-account. In such case, block 310 may involve the HMD displaying a second card interface that indicates one or more message-capable applications associated with the first user-account, which can be used to send a message with the proposed text.

In a variation on the foregoing example, an HMD may automatically send a message in response to detecting the singular touch gesture at block 308, without displaying and providing the user with the opportunity to select from different option(s) for messaging. For example, the HMD may first display a card with the proposed text for the body of a message. Then, when the HMD detects a single tap on its touchpad, the HMD may automatically send a message or message that includes the proposed text. Further, the HMD may display a second card indicating that the message was sent.

In some cases, there may be a particular second user-account, or possibly multiple user-accounts, that are pre-selected to send such messages (e.g., as indicated by user preferences). In other cases, the HMD may dynamically determine which second user-account or accounts should be used to automatically send a message based on various factors, such as context information related to the message, the type of message, and/or the recipient or recipients of the message, among other possibilities.

IV. Illustrative Applications

Figure 4:
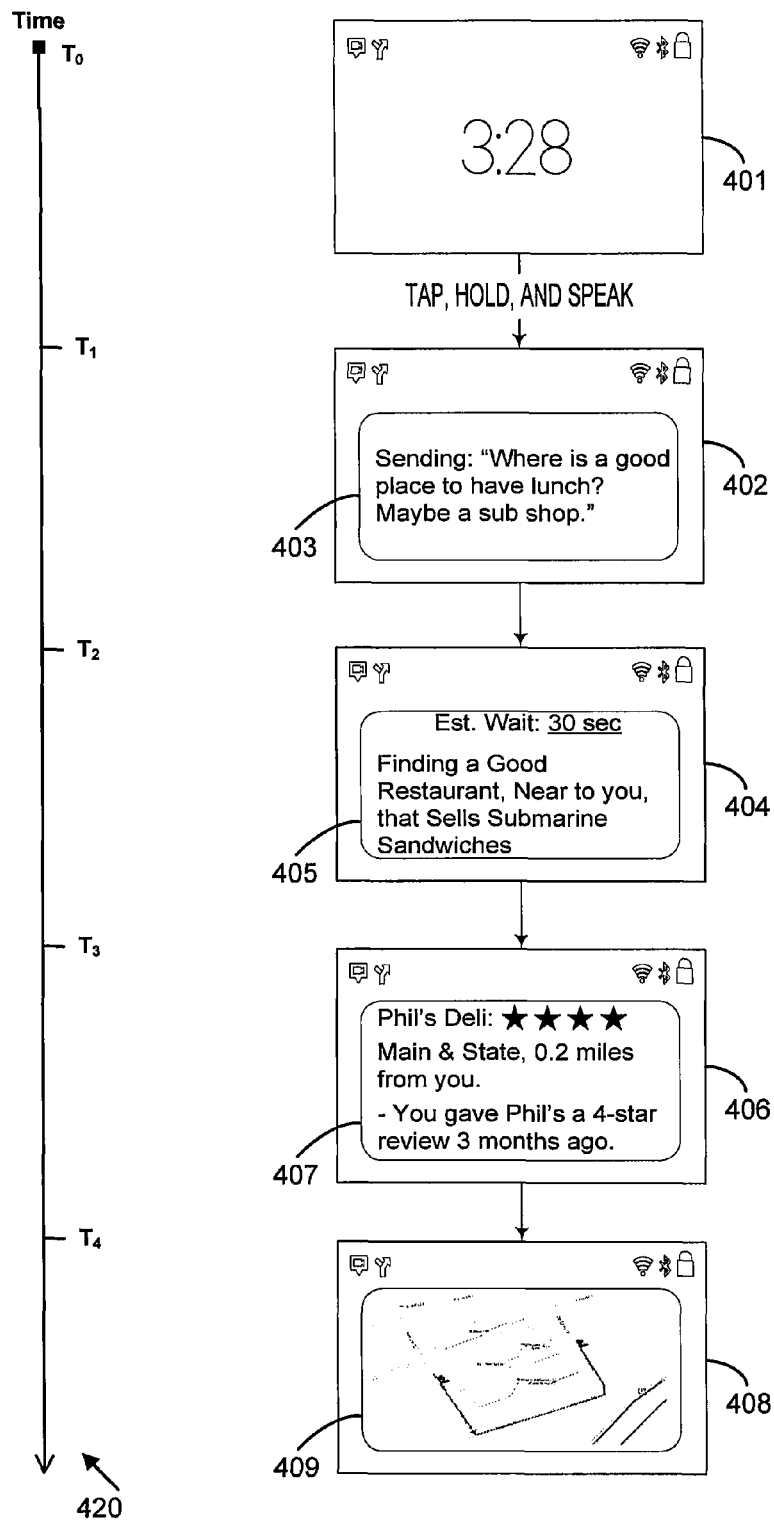
FIG. 4 is an illustration of screens from an HMD display, in accordance with an illustrative application of an example embodiment.

FIG. 4 is an illustration of screens from an HMD display, in accordance with an illustrative application of an example embodiment. In particular, FIG. 4 illustrates a scenario where an HMD user sends a voice request to a hybrid response system. Note that the screens 401, 402, 404, 406, and 408 may be representative of screen shots, and may appear in the order that they might occur, in accordance with an example embodiment. As such, the approximate times $T_0$ to $T_4$ at which the screenshots 401, 402, 404, 406, and 408 might be displayed are indicated on a timeline 420.

As shown at time $T_0$, the HMD may initially display a home screen 401. An HMD user may initiate a voice request from the home screen 401 by tapping and holding a touchpad on their HMD, and then speaking the voice request. In the illustrated example, the user taps and holds their touchpad, and then says: "Where is a good place to have lunch? Maybe a sub shop." When this voice request is received by the HMD, the HMD may apply a speech-to-text process to the voice request. The HMD may then display an initial request card, which includes a transcription of the spoken voice request, along with an indication that the request is being sent to the hybrid response system. Thus, as shown at time $T_1$, the HMD may display a screen 402 with an initial request card 403, which includes the text resulting from the speech-to-text process, e.g., "Sending: 'Where is a good place to have lunch? Maybe a sub shop.'" (Note that while the example shows a scenario where there is an accurate transcription, this may not always be the case.)

Further, at some time $T_2$ between transmission of the initial request card and receipt of a response, the HMD may display a status card. The status card may indicate an estimated wait time, and provide other updated information related to the handling of the voice request. In the illustrated example, screen 404 includes a status card 405. The status card 405 indicates that the estimated wait time for a response from the hybrid response system is 30 seconds.

Further, since the initial voice request may be a spoken-language or "natural-language" request, and the hybrid response system may apply, e.g., an NLP engine, in order to construct a request from the natural-language voice request. As such, the request that is processed by the hybrid response system may differ from the original voice request. Accordingly, a status card may indicate the actual request that is being processed by the hybrid response system. For instance, in the illustrated example, status card 405 indicates that the hybrid response system is "finding a good restaurant that sells submarine sandwiches near to you." Alternatively, the status card might simply include the speech-to-text transcription of the speech segment (and thus may include the same text as the initial request card).

Note that in practice, an HMD may only display the initial request card 403 for a short predetermined period of time (e.g., 3-5 seconds), and then "blank out" the display (e.g., such that little to no graphics are displayed) or return to some other screen (e.g., home screen 401), if no further input is received. Blanking out the display may reduce distractions so the wearer can better focus on their real-world environment. Further, the status card 405 may only be displayed if and when input is received that indicates to display the status card (e.g., when the user performs a certain gesture or gestures on the HMD's touchpad or says a certain voice command). Similarly, if no further input is received for a certain period after displaying the status card 405, the HMD may again blank out the display. Alternatively, the HMD may periodically display the status card 405 while waiting for a response. As yet another alternative, the HMD could continuously display the status card 405 while waiting for a response.

As further shown, the HMD may receive a response to the voice request from a hybrid response system and, at time $T_3$, may display a screen 406 with a response card 407. In the illustrated example, response card 407 indicates "Phil's Deli" has 4-star reviews, and further provides information related to Phil's Deli. Specifically, response card 407 indicates: "Main & State, 0.2 miles from you. You gave Phil's a 4-star review 3 months ago."

Further, according to an example embodiment, a "tap-to-next" action may be provided to the HMD. In particular, while the response card 407 is displayed on an HMD's display, the wearer may tap the HMD's touchpad to initiate an action that is pre-loaded by the hybrid response system (e.g., either by an automated process or a human guide that prepared the response). For instance, a guide may predict that the next action the wearer is likely to desire, after viewing response card 407, is viewing walking directions to Phil's Deli. Accordingly, the response to the voice request may include an indication that the next action is displaying a card with walking directions to Phil's. Accordingly, if the wearer taps the HMD's touchpad while viewing response card 407, the HMD may responsively take the next action that was indicated in the response. For example, at time $T_4$, the HMD may display a screen 408 with a directions card 409, which provides walking directions from the HMD's current location to Phil's Deli.

Advantageously, the response and/or the next action may be selected based on context information associated with the HMD, user preferences, and/or information from an associated user-account, which is provided to the hybrid response system by the HMD (so long as the user has opted to make such information available). For example, the hybrid response system may be provided with the HMD's current location. As such, the response may be customized by searching for restaurants that are located near the HMD's current location. Further, the next action may be customized by providing directions to Phil's Deli that begin at the HMD's current location.

As another example, the hybrid response system may be provided with access to other user-accounts that are associated with the user's account with the hybrid response system, one of which may be a user-account with a restaurant-review website. In the illustrated scenario, an automated process and/or a guide may access such user-accounts and learn that the associated user wrote a review giving Phil's Deli a 4-star rating, just three months ago. Based on this information, the response shown in response card 407 may be customized to indicate that the user gave Phil's Deli a 4-star review.

As yet another example, the hybrid response system may be provided with access to sensor data from the HMD. For instance, in the illustrated example, the hybrid response system may be provided with data from an IMU and/or other data from which it may be deduced that the wearer is walking (or more generally, is on foot), as opposed to riding a bicycle or riding in a car. (Note that the HMD might also determine that the wearer is on foot, and simply provide this context information to the hybrid response system.) Accordingly, an automated process or guide may pre-load walking directions to Phil's Deli for display as the "tap-to-next" action.

Note that small variations in the voice request and/or context information might lead a different next action to be associated with the same response card 407. For example, if the voice request had been "Where is a good place for lunch? Maybe a sub shop. With delivery available," then a slightly different response may be provided, and the displayed response card might differ as well. In particular, since there was an indicated preference for delivery, an automated process or guide may pre-load a menu for Phil's Deli and/or a delivery phone number for display, for the "tap-to-next" action. As another alternative, if context information indicates that the HMD wearer is riding in car, then an automated process or guide may pre-load driving directions to Phil's Deli, for the "tap-to-next" action (instead of walking directions). Other examples and variations are also possible.

Figure 5:
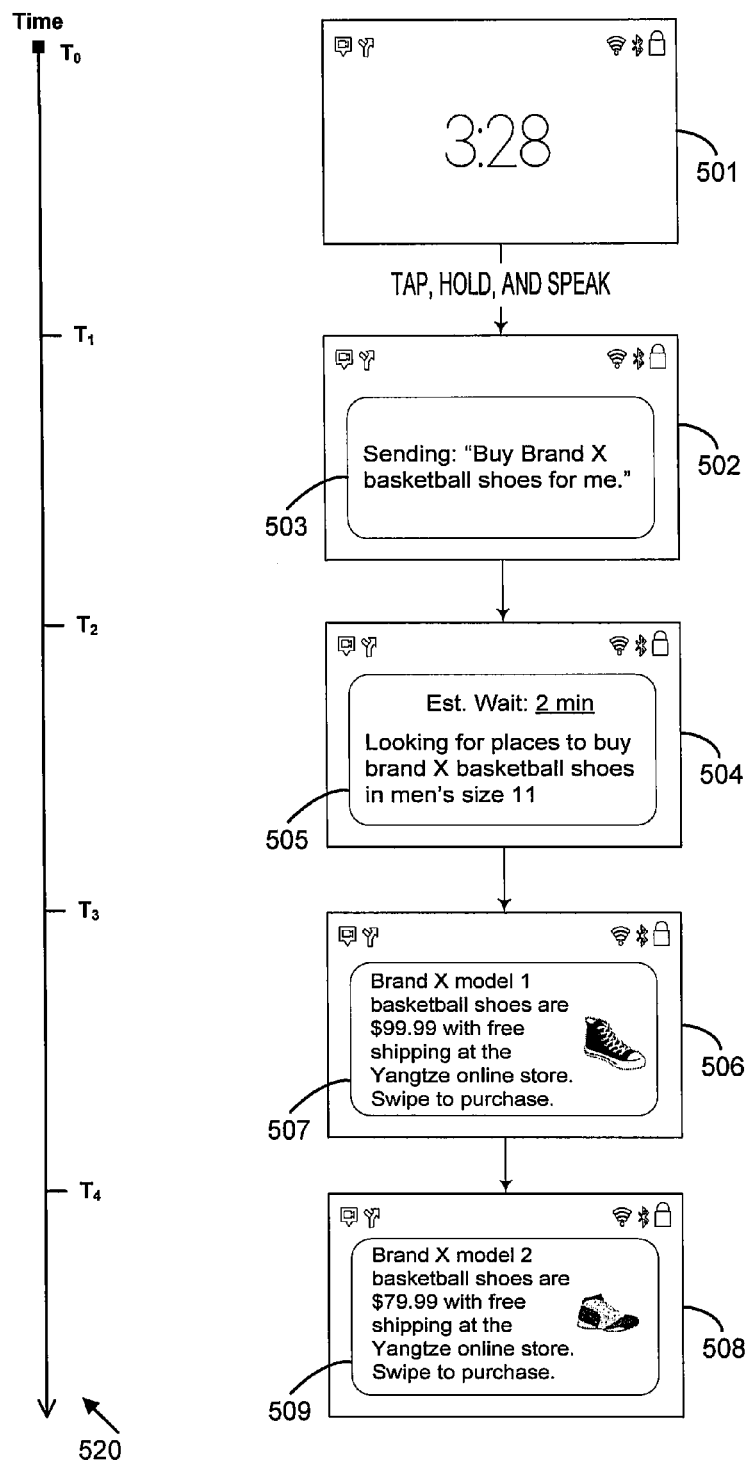
FIG. 5 is another illustration of screens from an HMD display, in accordance with an illustrative application of an example embodiment.

FIG. 5 is another illustration of screens from an HMD display, in accordance with an illustrative application of an example embodiment. In particular, FIG. 5 illustrates another scenario where an HMD user sends a voice request to a hybrid response system. Note that the screens 501, 502, 504, 506, and 508 may be representative of screen shots, and may appear in the order that they might occur, in accordance with an example embodiment. As such, the approximate times $T_0$ to $T_4$ at which each screen 501, 502, 504, 506, and 508 might be displayed is indicated on a timeline 520.

As shown at time $T_0$, the HMD may again display a home screen 501. And, an HMD user may again initiate a voice request from the home screen 501 by tapping and holding a touchpad on their HMD, and then speaking the voice request. In the scenario illustrated in FIG. 5, the voice request is: "Buy the Brand X basketball shoes for me." When this voice request is received by the HMD, the HMD may apply a speech-to-text process to the voice request. The HMD may then display an initial request card, which includes a transcription of the spoken voice request (e.g., the literal transcription of the spoken words), along with an indication that the request is being sent to the hybrid response system. Thus, as shown at time $T_1$, the HMD may display a screen 502 with an initial request card 503 that indicates: "Sending: 'Buy the Brand X basketball shoes for me.'"

Further, at some time $T_2$ between transmission of the initial request card and receipt of a response, the HMD may display a screen 504 that includes a status card 505. The status card 505 indicates that the estimated wait time for a response from the hybrid response system is two minutes. Further, status card 505 indicates that the hybrid response system is "Looking for places to buy brand X basketball shoes in men's size 11." Note that the voice request indicated in the status card 505 may have been personalized based on user-account information that the user opted to make available to the hybrid response system. In particular, an automated process or a guide may have determined from such account information (e.g., past purchases and/or stored purchasing preferences) that the particular user wears size 11 shoes.

As further shown in FIG. 5, the HMD may receive a response to the voice request from a hybrid response system and, at time $T_3$, may display a screen 506 with a response card 507. In the illustrated example, response card 507 indicates: "Brand X model 1 basketball shoes are available for $99.99 with free shipping from the Yangtze online store. Swipe to purchase." In this example, the hybrid response system has provided information for a "swipe-to-next" action in association with the information for response card 507. More specifically, in this example, a swipe on the HMD's touchpad is the singular action that is used to initiate the next action of purchasing Brand X model 1 basketball shoes in size 11.

Further, FIG. 5 provides an example of an additional aspect of some embodiments; specifically, that multiple next actions may be associated with the same response, with each next action being mapped to a different singular touch gesture. For example, in the scenario illustrated in FIG. 5, the HMD may be provided with information for a "tap-to-next" action, in addition to the information for the "swipe-to-next" action described above. For instance, a guide may predict that the next action the wearer is likely to desire, if they don't want to purchase the shoes, is viewing a different model of Brand X shoes. (Note that this decision may be reached for various reasons. For instance, in the illustrated scenario, where the voice request specifies a brand and style of shoes, but not the exact model, a guide might originally respond with the most popular or best-selling model of brand X shoes, and pre-load the second most popular model for a "tap-to-next" action.) Accordingly, the response may indicate that a tap-to-next action associated with the response is displaying a card for Brand X model 2 basketball shoes. Thus, if the HMD detects a tap gesture while the HMD is displaying response card 507, the HMD may responsively display a screen 508 with a card 509 that indicates: "Brand X model 2 basketball shoes are available for $79.99 with free shipping from the Yangtze online store. Swipe to purchase." Accordingly, a user may be able to swipe to access purchase the Brand X model 2 basketball shoes via their account with the Yangtze online store. Note that if the user's account with the Yangtze online store is linked to the user's account with the hybrid response system, the purchase may be initiated with the singular touch gesture (e.g., by swiping). However, it is also possible that one or more additional inputs may be required to confirm a purchase.

In the scenario shown in FIG. 5, the response and/or the next action may again be selected based on context information associated with the HMD, user preferences, and/or information from an associated user-account. For example, based on such information, a guide may be fairly confident that the user wants to purchase Brand X model 1 basketball shoes. However, the guide may be uncertain as to the particular store where the user would like to make the purchase. In this scenario, a guide send information for other stores selling same model (e.g., Brand X model 1) for display via tap-to-next card(s). Other examples are also possible.

V. Illustrative Head-Mountable Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 6A:
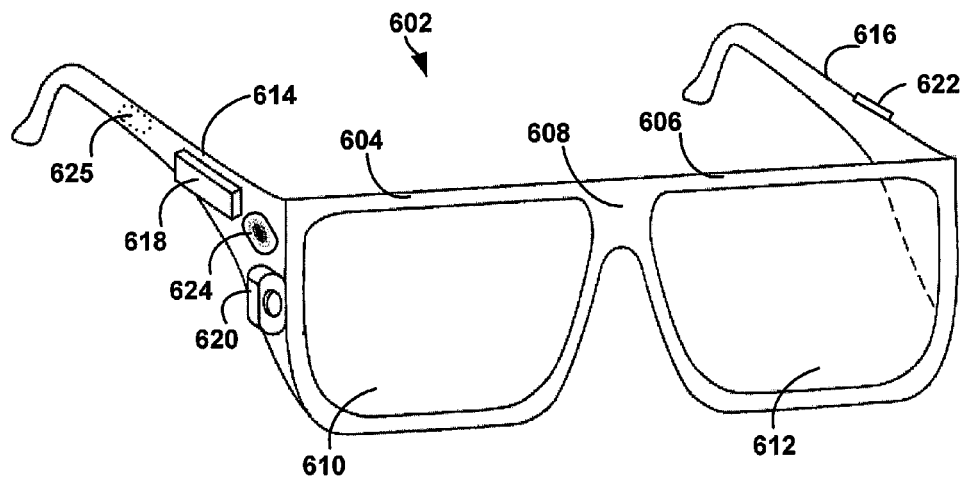
FIG. 6A illustrates a wearable computing system according to an example embodiment.

FIG. 6A illustrates a wearable computing system according to an example embodiment. In FIG. 6A, the wearable computing system takes the form of a head-mountable device (HMD) 602 (which may also be referred to as a head-mounted display). It should be understood, however, that example systems and devices may take the form of or be implemented within or in association with other types of devices, without departing from the scope of the invention. As illustrated in FIG. 6A, the HMD 602 includes frame elements including lens-frames 604, 606 and a center frame support 608, lens elements 610, 612, and extending side-arms 614, 616. The center frame support 608 and the extending side-arms 614, 616 are configured to secure the HMD 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the HMD 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614, 616 may each be projections that extend away from the lens-frames 604, 606, respectively, and may be positioned behind a user's ears to secure the HMD 602 to the user. The extending side-arms 614, 616 may further secure the HMD 602 to the user by extending around a rear portion of the user's head. Additionally or alternatively, for example, the HMD 602 may connect to or be affixed within a head-mounted helmet structure. Other configurations for an HMD are also possible.

The HMD 602 may also include an on-board computing system 618, an image capture device 620, a sensor 622, and a finger-operable touch pad 624. The on-board computing system 618 is shown to be positioned on the extending side-arm 614 of the HMD 602; however, the on-board computing system 618 may be provided on other parts of the HMD 602 or may be positioned remote from the HMD 602 (e.g., the on-board computing system 618 could be wire- or wirelessly-connected to the HMD 602). The on-board computing system 618 may include a processor and memory, for example. The on-board computing system 618 may be configured to receive and analyze data from the image capture device 620 and the finger-operable touch pad 624 (and possibly from other sensory devices, user interfaces, or both) and generate images for output by the lens elements 610 and 612.

The image capture device 620 may be, for example, a camera that is configured to capture still images and/or to capture video. In the illustrated configuration, image capture device 620 is positioned on the extending side-arm 614 of the HMD 602; however, the image capture device 620 may be provided on other parts of the HMD 602. The image capture device 620 may be configured to capture images at various resolutions or at different frame rates. Many image capture devices with a small form-factor, such as the cameras used in mobile phones or webcams, for example, may be incorporated into an example of the HMD 602.

Further, although FIG. 6A illustrates one image capture device 620, more image capture device may be used, and each may be configured to capture the same view, or to capture different views. For example, the image capture device 620 may be forward facing to capture at least a portion of the real-world view perceived by the user. This forward facing image captured by the image capture device 620 may then be used to generate an augmented reality where computer generated images appear to interact with or overlay the real-world view perceived by the user.

The sensor 622 is shown on the extending side-arm 616 of the HMD 602; however, the sensor 622 may be positioned on other parts of the HMD 602. For illustrative purposes, only one sensor 622 is shown. However, in an example embodiment, the HMD 602 may include multiple sensors. For example, an HMD 602 may include sensors 602 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 624 is shown on the extending side-arm 614 of the HMD 602. However, the finger-operable touch pad 624 may be positioned on other parts of the HMD 602. Also, more than one finger-operable touch pad may be present on the HMD 602. The finger-operable touch pad 624 may be used by a user to input commands. The finger-operable touch pad 624 may sense at least one of a pressure, position and/or a movement of one or more fingers via capacitive sensing, resistance sensing, or a surface acoustic wave process, among other possibilities. The finger-operable touch pad 624 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

In a further aspect, HMD 602 may be configured to receive user input in various ways, in addition or in the alternative to user input received via finger-operable touch pad 624. For example, on-board computing system 618 may implement a speech-to-text process and utilize a syntax that maps certain spoken commands to certain actions. In addition, HMD 602 may include one or more microphones via which a wearer's speech may be captured. Configured as such, HMD 602 may be operable to detect spoken commands and carry out various computing functions that correspond to the spoken commands.

As another example, HMD 602 may interpret certain head-movements as user input. For example, when HMD 602 is worn, HMD 602 may use one or more gyroscopes and/or one or more accelerometers to detect head movement. The HMD 602 may then interpret certain head-movements as being user input, such as nodding, or looking up, down, left, or right. An HMD 602 could also pan or scroll through graphics in a display according to movement. Other types of actions may also be mapped to head movement.

As yet another example, HMD 602 may interpret certain gestures (e.g., by a wearer's hand or hands) as user input. For example, HMD 602 may capture hand movements by analyzing image data from image capture device 620, and initiate actions that are defined as corresponding to certain hand movements.

As a further example, HMD 602 may interpret eye movement as user input. In particular, HMD 602 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 602 also includes a speaker 625 for generating audio output. In one example, the speaker could be in the form of a bone conduction speaker, also referred to as a bone conduction transducer (BCT). Speaker 625 may be, for example, a vibration transducer or an electroacoustic transducer that produces sound in response to an electrical audio signal input. The frame of HMD 602 may be designed such that when a user wears HMD 602, the speaker 625 contacts the wearer. Alternatively, speaker 625 may be embedded within the frame of HMD 602 and positioned such that, when the HMD 602 is worn, speaker 625 vibrates a portion of the frame that contacts the wearer. In either case, HMD 602 may be configured to send an audio signal to speaker 625, so that vibration of the speaker may be directly or indirectly transferred to the bone structure of the wearer. When the vibrations travel through the bone structure to the bones in the middle ear of the wearer, the wearer can interpret the vibrations provided by BCT 625 as sounds.

Various types of bone-conduction transducers (BCTs) may be implemented, depending upon the particular implementation. Generally, any component that is arranged to vibrate the HMD 602 may be incorporated as a vibration transducer. Yet further it should be understood that an HMD 602 may include a single speaker 625 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 625 can vibrate the wearer's bone structure.

Figure 6B:
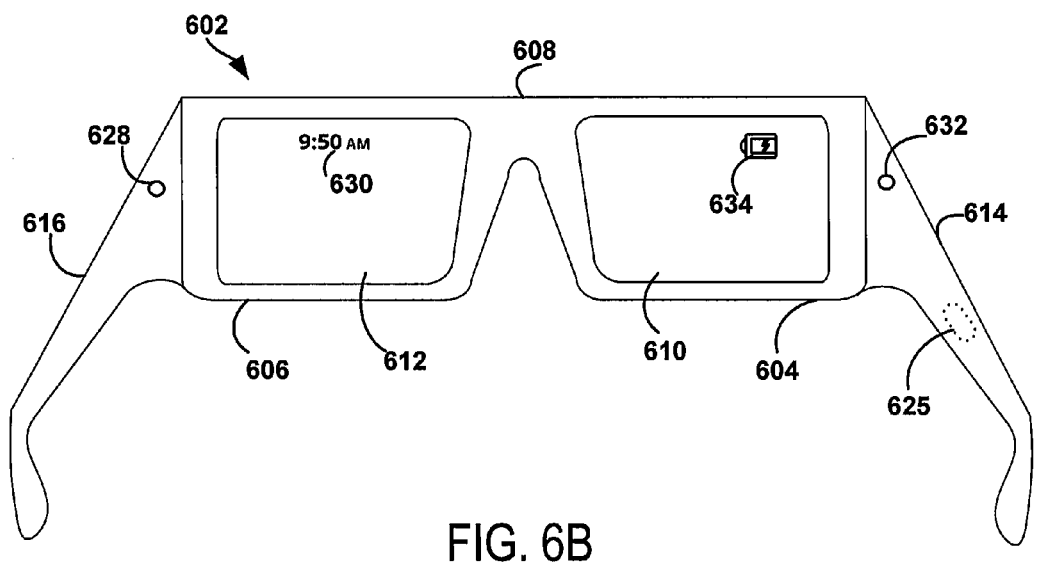
FIG. 6B illustrates an alternate view of the wearable computing device illustrated in FIG. 6A.

FIG. 6B illustrates an alternate view of the wearable computing device illustrated in FIG. 6A. As shown in FIG. 6B, the lens elements 610, 612 may act as display elements. The HMD 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may not be used (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or LED source and scanning system could be used to draw a raster display directly onto the retina of one or more of the user's eyes. Other possibilities exist as well.

Figure 6C:
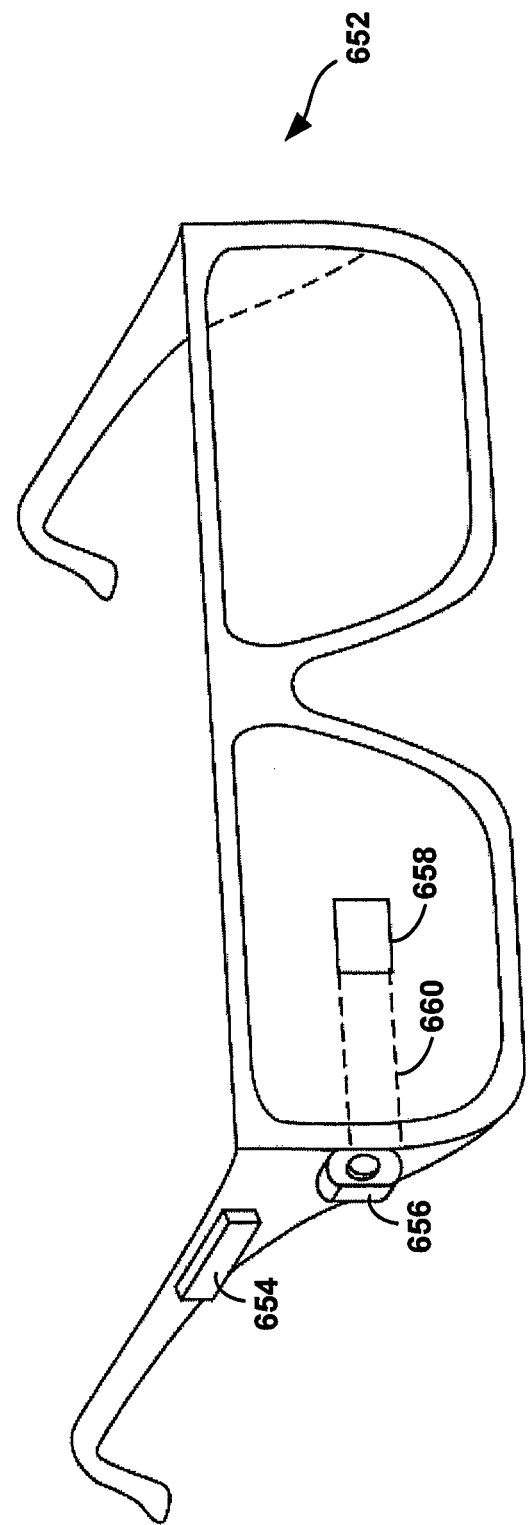
FIG. 6C illustrates another wearable computing system according to an example embodiment.

FIG. 6C illustrates another wearable computing system according to an example embodiment, which takes the form of an HMD 652. The HMD 652 may include frame elements and side-arms such as those described with respect to FIGS. 6A and 6B. The HMD 652 may additionally include an on-board computing system 654 and an image capture device 656, such as those described with respect to FIGS. 6A and 6B. The image capture device 656 is shown mounted on a frame of the HMD 652. However, the image capture device 656 may be mounted at other positions as well.

As shown in FIG. 6C, the HMD 652 may include a single display 658 which may be coupled to the device. The display 658 may be formed on one of the lens elements of the HMD 652, such as a lens element described with respect to FIGS. 6A and 6B, and may be configured to overlay computer-generated graphics in the user's view of the physical world. The display 658 is shown to be provided in a center of a lens of the HMD 652, however, the display 658 may be provided in other positions, such as for example towards either the upper or lower portions of the wearer's field of view. The display 658 is controllable via the computing system 654 that is coupled to the display 658 via an optical waveguide 660.

Figure 6D:
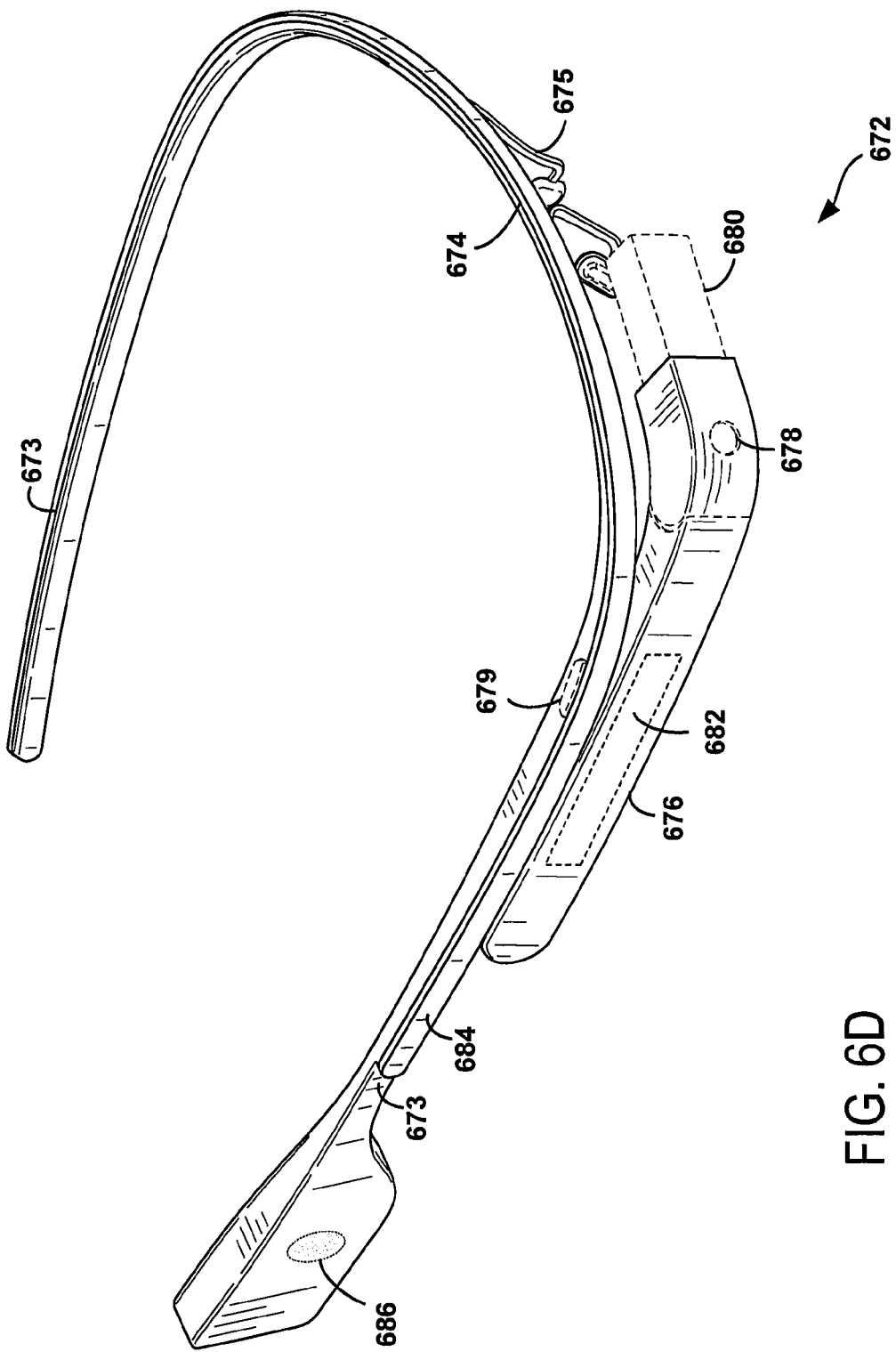
FIG. 6D illustrates another wearable computing system according to an example embodiment.

FIG. 6D illustrates another wearable computing system according to an example embodiment, which takes the form of a monocular HMD 672. The HMD 672 may include side-arms 673, a center frame support 674, and a bridge portion with nosepiece 675. In the example shown in FIG. 6D, the center frame support 674 connects the side-arms 673. The HMD 672 does not include lens-frames containing lens elements. The HMD 672 may additionally include a component housing 676, which may include an on-board computing system (not shown), an image capture device 678, a button 679 for operating the image capture device 678 (and/or usable for other purposes), and a touchpad 682. Component housing 676 may also include other electrical components and/or may be electrically connected to electrical components at other locations within or on the HMD. HMD 672 also includes a BCT 686.

The HMD 672 may include a single display 680, which may be coupled to one of the side-arms 673 via the component housing 676. In an example embodiment, the display 680 may be a see-through display, which is made of glass and/or another transparent or translucent material, such that the wearer can see their environment through the display 680. Further, the component housing 676 may include the light sources (not shown) for the display 680 and/or optical elements (not shown) to direct light from the light sources to the display 680. As such, display 680 may include optical features that direct light that is generated by such light sources towards the wearer's eye, when HMD 672 is being worn.

In a further aspect, HMD 672 may include a sliding feature 684, which may be used to adjust the length of the side-arms 673. Thus, sliding feature 684 may be used to adjust the fit of HMD 672. Further, an HMD may include other features that allow a wearer to adjust the fit of the HMD, without departing from the scope of the invention.

Figure 6E:
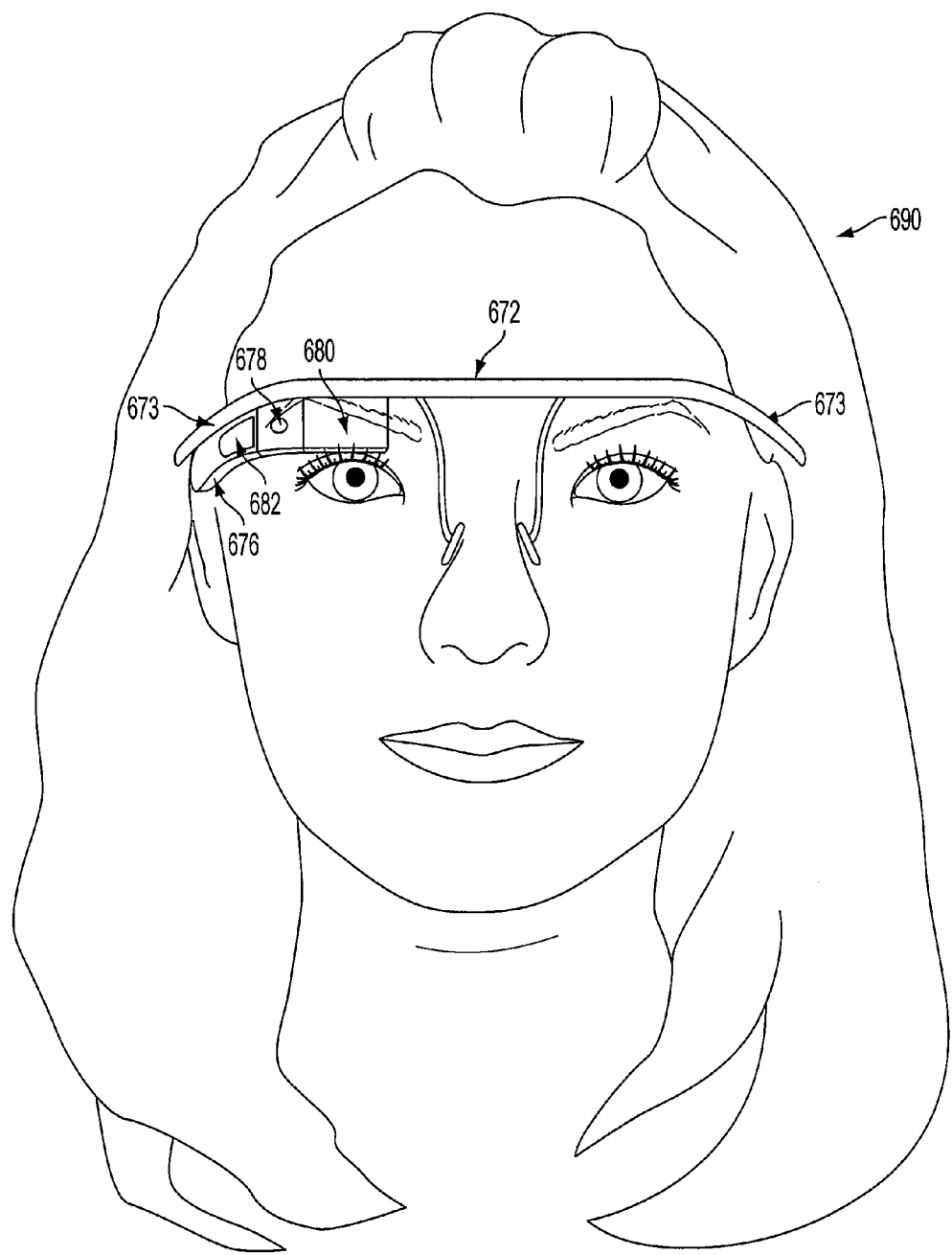
FIGS. 6E to 6G are simplified illustrations of the wearable computing system shown in FIG. 6D, being worn by a wearer.
Figure 6F:
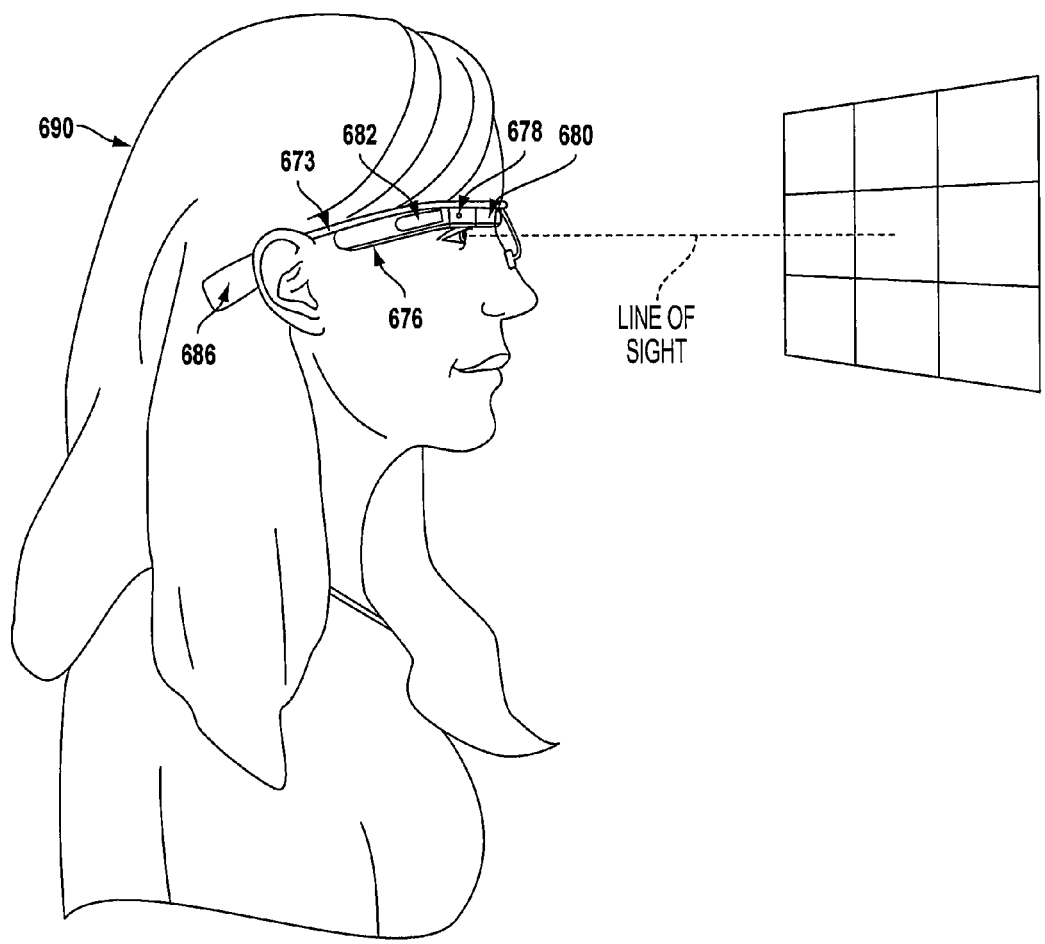
Figure 6G:
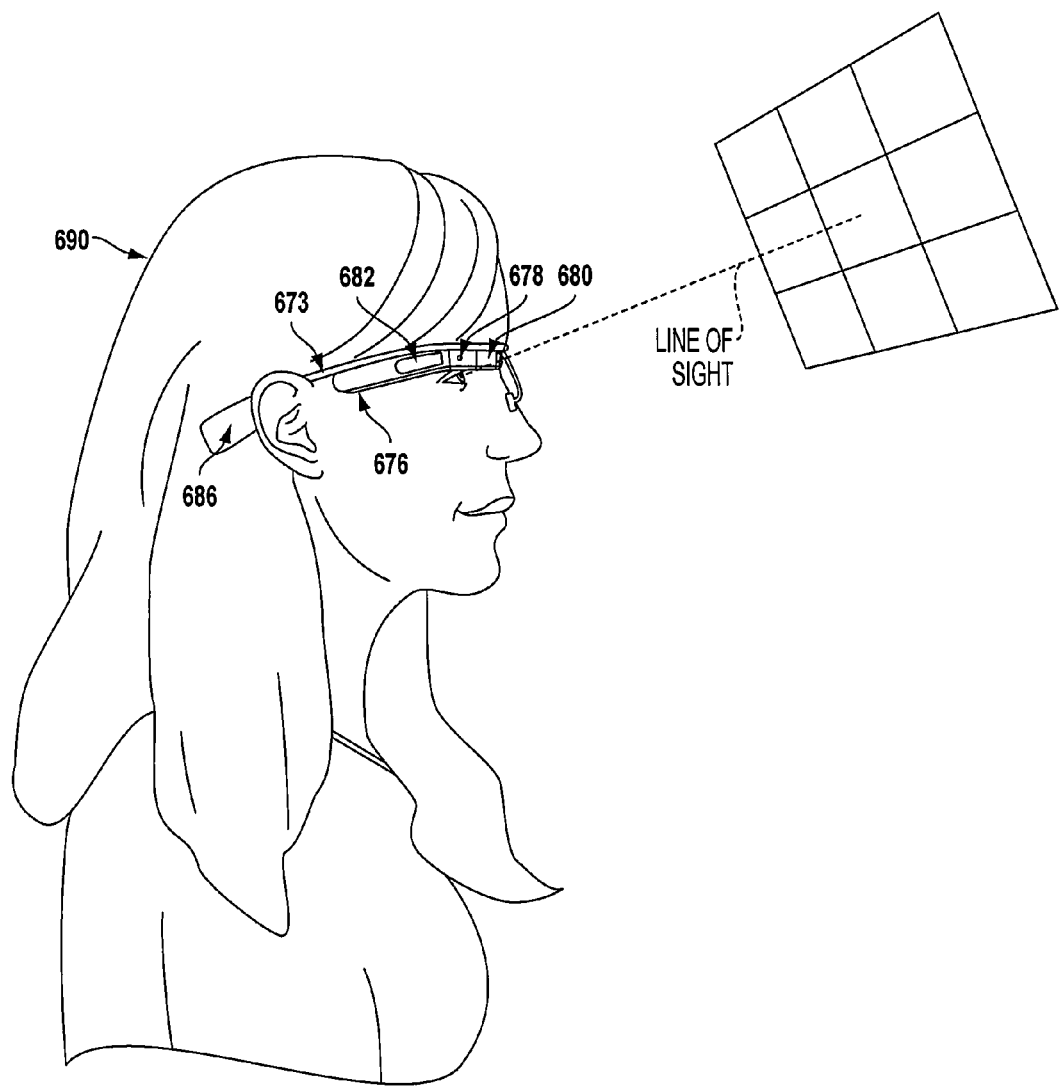

FIGS. 6E to 6G are simplified illustrations of the HMD 672 shown in FIG. 6D, being worn by a wearer 690. As shown in FIG. 6F, when HMD 672 is worn, BCT 686 is arranged such that when HMD 672 is worn, BCT 686 is located behind the wearer's ear. As such, BCT 686 is not visible from the perspective shown in FIG. 6E.

In the illustrated example, the display 680 may be arranged such that when HMD 672 is worn, display 680 is positioned in front of or proximate to a user's eye when the HMD 672 is worn by a user. For example, display 680 may be positioned below the center frame support and above the center of the wearer's eye, as shown in FIG. 6E. Further, in the illustrated configuration, display 680 may be offset from the center of the wearer's eye (e.g., so that the center of display 680 is positioned to the right and above of the center of the wearer's eye, from the wearer's perspective).

Configured as shown in FIGS. 6E to 6G, display 680 may be located in the periphery of the field of view of the wearer 690, when HMD 672 is worn. Thus, as shown by FIG. 6F, when the wearer 690 looks forward, the wearer 690 may see the display 680 with their peripheral vision. As a result, display 680 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 680 is located as shown, the wearer 690 may view the display 680 by, e.g., looking up with their eyes only (possibly without moving their head). This is illustrated as shown in FIG. 6G, where the wearer has moved their eyes to look up and align their line of sight with display 680. A wearer might also use the display by tilting their head down and aligning their eye with the display 680.

Figure 7A:
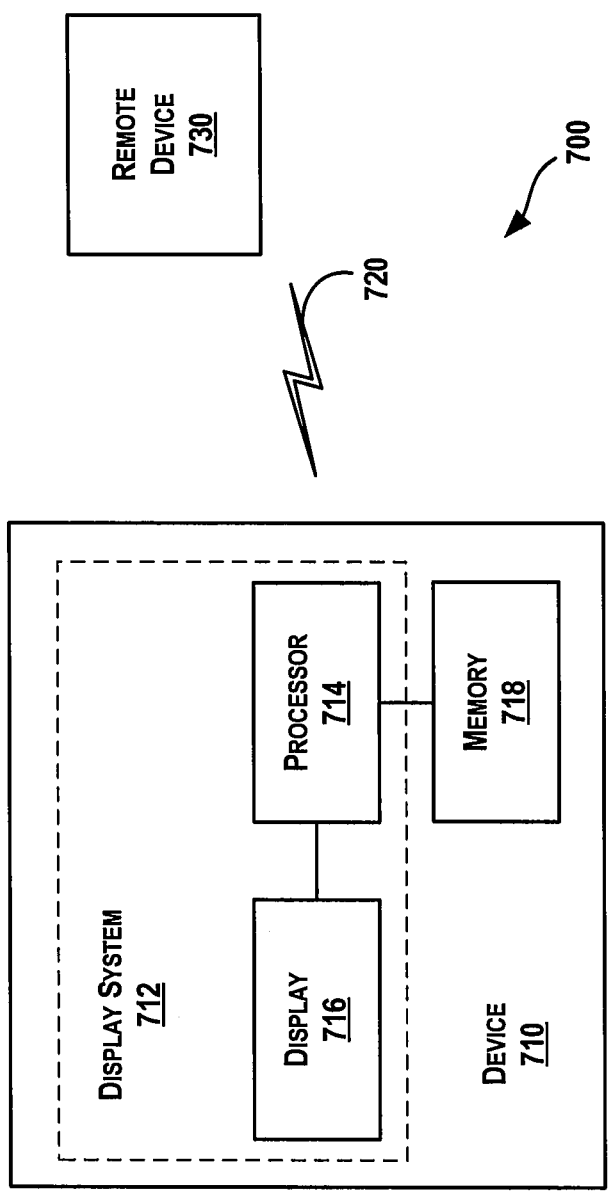
FIG. 7A is a simplified block diagram of a computing device according to an example embodiment.

FIG. 7A is a simplified block diagram a computing device 710 according to an example embodiment. In an example embodiment, device 710 communicates using a communication link 720 (e.g., a wired or wireless connection) to a remote device 730. The device 710 may be any type of device that can receive data and display information corresponding to or associated with the data. For example, the device 710 may take the form of or include a head-mountable display, such as the head-mounted devices 602, 652, or 672 that are described with reference to FIGS. 6A to 6G.

The device 710 may include a processor 714 and a display 716. The display 716 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, head-mountable display, tablet computing device, etc., that is configured to transmit data to the device 710. The remote device 730 and the device 710 may contain hardware to enable the communication link 720, such as processors, transmitters, receivers, antennas, etc.

Further, remote device 730 may take the form of or be implemented in a computing system that is in communication with and configured to perform functions on behalf of client device, such as computing device 710. Such a remote device 730 may receive data from another computing device 710 (e.g., an HMD 602, 652, or 672 or a mobile phone), perform certain processing functions on behalf of the device 710, and then send the resulting data back to device 710. This functionality may be referred to as "cloud" computing.

In FIG. 7A, the communication link 720 is illustrated as a wireless connection; however, wired connections may also be used. For example, the communication link 720 may be a wired serial bus such as a universal serial bus or a parallel bus. A wired connection may be a proprietary connection as well. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 730 may be accessible via the Internet and may include a computing cluster associated with a particular web service (e.g., social-networking, photo sharing, address book, etc.).

C. Example Image Projection

Figure 7B:
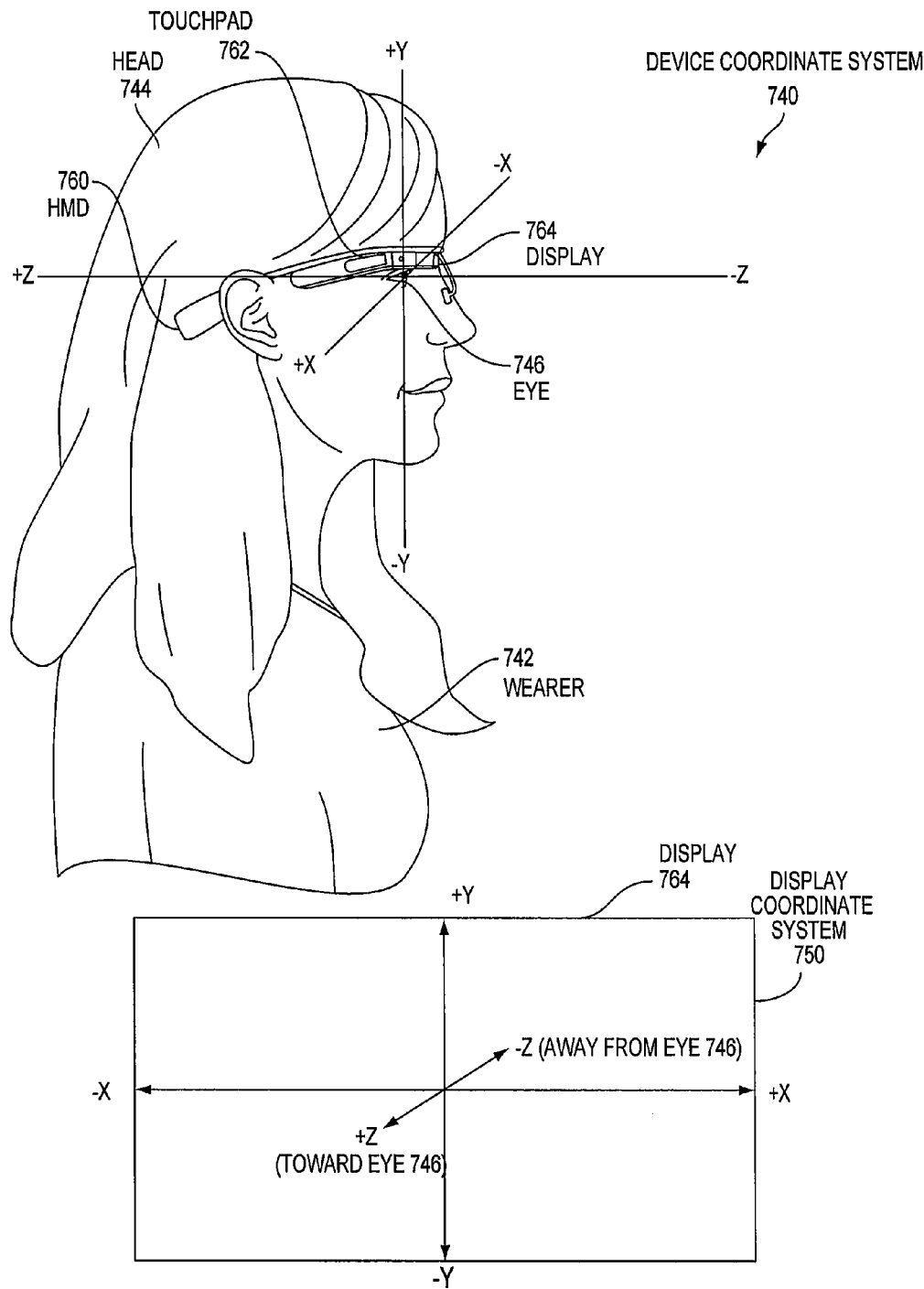
FIG. 7B shows a projection of an image by a head-mountable device, according to an example embodiment.

FIG. 7B shows an example projection of UI elements described herein via an image 780 by an example head-mountable device (HMD) 752, according to an example embodiment. Other configurations of an HMD may be also be used to present the UI described herein via image 780. FIG. 7B shows wearer 754 of HMD 752 looking at an eye of person 756. As such, wearer 754's gaze, or direction of viewing, is along gaze vector 760. A horizontal plane, such as horizontal gaze plane 764 can then be used to divide space into three portions: space above horizontal gaze plane 764, space in horizontal gaze plane 764, and space below horizontal gaze plane 764. In the context of projection plane 776, horizontal gaze plane 760 appears as a line that divides projection plane into a subplane above the line of horizontal gaze plane 760, a subplane a subspace below the line of horizontal gaze plane 760, and the line where horizontal gaze plane 760 intersects projection plane 776. In FIG. 7B, horizontal gaze plane 764 is shown using dotted lines.

Additionally, a dividing plane, indicated using dividing line 774 can be drawn to separate space into three other portions: space to the left of the dividing plane, space on the dividing plane, and space to right of the dividing plane. In the context of projection plane 776, the dividing plane intersects projection plane 776 at dividing line 774. Thus the dividing plane divides projection plane into: a subplane to the left of dividing line 774, a subplane to the right of dividing line 774, and dividing line 774. In FIG. 7B, dividing line 774 is shown as a solid line.

Humans, such wearer 754, when gazing in a gaze direction, may have limits on what objects can be seen above and below the gaze direction. FIG. 7B shows the upper visual plane 770 as the uppermost plane that wearer 754 can see while gazing along gaze vector 760, and shows lower visual plane 772 as the lowermost plane that wearer 754 can see while gazing along gaze vector 760. In FIG. 7B, upper visual plane 770 and lower visual plane 772 are shown using dashed lines.

The HMD can project an image for view by wearer 754 at some apparent distance 762 along display line 782, which is shown as a dotted and dashed line in FIG. 7B. For example, apparent distance 762 can be 1 meter, four feet, infinity, or some other distance. That is, HMD 752 can generate a display, such as image 780, which appears to be at the apparent distance 762 from the eye of wearer 754 and in projection plane 776. In this example, image 780 is shown between horizontal gaze plane 764 and upper visual plane 770; that is image 780 is projected above gaze vector 760. In this example, image 780 is also projected to the right of dividing line 774. As image 780 is projected above and to the right of gaze vector 760, wearer 754 can look at person 756 without image 780 obscuring their general view. In one example, the display element of the HMD 752 is translucent when not active (i.e. when image 780 is not being displayed), and so the wearer 754 can perceive objects in the real world along the vector of display line 782.

Other example locations for displaying image 780 can be used to permit wearer 754 to look along gaze vector 760 without obscuring the view of objects along the gaze vector. For example, in some embodiments, image 780 can be projected above horizontal gaze plane 764 near and/or just above upper visual plane 770 to keep image 780 from obscuring most of wearer 754's view. Then, when wearer 754 wants to view image 780, wearer 754 can move their eyes such that their gaze is directly toward image 780.

VI. Conclusion

The above detailed description describes various features and functions of the disclosed systems, devices, and methods with reference to the accompanying figures.

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is remved. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

We claim:

1. A method carried out by a head-mountable device comprising:
   sending, a speech-segment message to a hybrid response system in response to detecting a first singular touch gesture on a touchpad of the head-mountable device (HMD),
      wherein the HMD comprises a near-eye display, and wherein the touchpad is located on a side-arm of the HMD,
      wherein the speech-segment message is indicative of a speech-segment detected in audio data captured at the HMD by at least one microphone, wherein the speech-segment is associated with a first user-account with the hybrid response system, and wherein the speech-segment message comprises an initial query;
   receiving, at the HMD, a response message from the hybrid response system, wherein the response message comprises: both (a) an answer to the initial query and (b) an indication of a next action to be cued in anticipation of the initial query, wherein the next action is an anticipated actionable follow-up request related to the answer of the initial query; and
   in response to receiving the response message:
      displaying, on the HMD, a first card interface that includes an indication of the answer to the initial query; and
      while displaying the first card interface that indicates the answer to the initial query, detecting touchpad data corresponding to a second singular touch gesture on the touchpad and responsively initiating the next action corresponding to the anticipated follow-up request originally indicated in the response message by displaying a second card interface of a cued next action.

2. The method of claim 1, wherein the second singular touch gesture comprises a single tap on the touchpad.

3. The method of claim 1, wherein initiating the next action comprises displaying a first card interface that indicates the information related to the response message.

4. The method of claim 1, wherein the indication of the next action comprises an indication of a transaction that is associated with the response message.

5. The method of claim 4, wherein the response message comprises an indication of a product or service, and wherein the transaction comprises a purchase of the product.

6. The method of claim 4, wherein initiating the next action comprises initiating a purchase of a product or service via a second user-account that is associated with the first user-account.

7. The method of claim 4, wherein initiating the at least one next action comprises displaying the first card interface that requests input that indicates whether or not to purchase a product or service via a second user-account associated with the first user-account.

8. The method of claim 1, wherein the response message comprises proposed text for a message that can be sent via at least one second user-account associated with the first user-account, and wherein the indication of the next action comprises an indication to display the first card interface that indicates message-capable applications associated with the first user-account.

9. The method of claim 8, wherein initiating the next action comprises displaying the first card interface that indicates the one or more message-capable applications associated with the first user-account.

10. The method of claim 1, wherein the response message comprises proposed text for the message that can be sent via at least one second user-account associated with the first user-account, and wherein the indication of the next action comprises an indication to send a message that includes the proposed text via the at least one second user-account.

11. The method of claim 8, wherein initiating the next action comprises sending, via the at least one second user-account, the message that includes the proposed text.

12. The method of claim 1, wherein the HMD does not display any indication of the cued next action before detecting the second singular touch gesture and responsively initiating the next action.

13. A head-mountable device system comprising:
at least one microphone configured to provide an audio signal based on speech detected at the head-mountable device (HMD), wherein the HMD comprises a near-eye display and a touchpad that is located on a side-arm of the HMD; a network interface;
a control system configured to: detect a speech segment in the audio signal with the at least one microphone in response to detecting a first singular touch gesture on the touchpad, wherein the speech segment comprises an initial query;
send a speech-segment message to a hybrid human and automated response system, wherein the speech-segment message is indicative of the speech segment, and wherein the speech-segment message is associated with a first user-account with the hybrid human and automated response system;
receive, by the HMD, a response message from the hybrid response system, wherein the response message comprises: both (a) an answer to the initial query and (b) an indication of a next action to be cued in anticipation of the initial query, wherein the next action is responsive to an anticipated actionable follow-up request related to the answer to the initial query; and
in response to receipt of the response message:
display a first card interface that includes an indication of the answer to the initial query; and
while displaying the first card interface that indicates the answer to the initial query, detecting touchpad data corresponding to a second singular touch gesture on the touchpad and responsively initiate the next action corresponding to the anticipated follow-up request initially indicated in the response message by displaying a second card interface of a cued next action.

14. The system of claim 13, wherein the singular touch gesture comprises a single tap on the touchpad.

15. The system of claim 13, wherein the indication of the next action comprises information related to the response message, and wherein initiating the at least one next action comprises displaying the first card interface that indicates the information related to the response.

16. The system of claim 13, wherein the indication of the next action comprises an indication of a transaction that is associated with the response message, and wherein the response message comprises an indication of a product or service, and wherein the transaction comprises a purchase of the product.

17. A non-transitory computer readable medium having stored therein instructions executable by a computing device to cause the computing device of a head-mountable device to perform functions comprising:
sending a speech-segment message to a hybrid human and automated response system, wherein the speech-segment message is indicative of a speech segment that is detected in audio data captured at least one microphone in response to detecting a first singular touch gesture on a touchpad on a head-mountable device (HMD) that comprises a near-eye display and a touchpad that is located on a side-arm of the HMD,
wherein the speech segment is associated with a first user-account with the hybrid human and automated response system, and wherein the speech-segment message comprises an initial query;
receiving, by the HMD, a response message from the hybrid response system, wherein the response message comprises: both (a) an answer to the initial query, and (b) an indication of a next action to be cued in anticipation of the initial query, wherein the next action is responsive to an anticipated actionable follow-up request related to the answer to the initial query;
in response to receipt of the response message: displaying a first card interface that includes an indication of the answer to the initial query; and
while displaying the first card interface that indicates the answer to the initial query,
detecting touchpad data corresponding to a second singular touch gesture on the touchpad and responsively initiating the next action corresponding to the anticipated follow-up request initially indicated in the response message by displaying a second card interface of a cued next action.

18. The non-transitory computer readable medium of claim 17, wherein the second singular touch gesture comprises a single tap on the touchpad.

19. The method of claim 1, wherein detecting touchpad data corresponding to the second singular touch gesture on the touchpad and responsively initiating the next action corresponding to the anticipated follow-up request comprises: operating a processor of the HMD to interpret the second singular touch gesture at any location on the touchpad as an indication to initiate the next action; and responsive detecting touchpad data corresponding to the second singular touch gesture at any location on the touchpad, initiating the next action corresponding to the anticipated follow-up request.

20. A method carried out by a wearable computing device comprising:

receiving, by a hybrid response computing system, a speech-segment message generated by the wearable computing device comprising a touchpad, wherein the speech-segment message is indicative of a speech segment that is detected in audio data captured at the wearable computing device by at least one microphone in response to detecting a first singular touch gesture on the touchpad;

determining, by the hybrid response computing system, that the speech-segment is associated with a first user-account and comprises a query, determining, by the hybrid response computing system, an answer to the query;

determining, by the hybrid response computing system, an anticipated follow-up request related to the answer;

determining, by the hybrid response computing system, a singular next action responsive to the anticipated follow-up request;

after determining both the answer and the next action, sending a response message from the hybrid response system to the wearable computing device, wherein the response message comprises: both (a) the answer to the query and (b) an indication of the next action corresponding to the response to the anticipated follow-up request to be cued in anticipation of the query; and receiving an indication to initiate the next action, wherein the indication corresponds to detecting a second singular touch gesture on the touchpad of the wearable computing device during display of a first card interface that includes the indication of the response message; and responsively initiating the next action indicated in the response message by displaying a second card interface of a cued next action.

21. The method of claim 20, wherein the second singular touch gesture corresponds to a singular touch gesture at any location on the touchpad.

22. The method of claim 20, further comprising:
determining context information corresponding to the first user-account; and
using the context information as a further basis for determining the anticipated follow-up request.

23. The method of claim 20, further comprising:
determining context information corresponding to the first user-account; and
using the context information as a further basis for determining the next action.

* * * * *